(12) United States Patent
Alonso

(10) Patent No.: US 11,421,579 B1
(45) Date of Patent: Aug. 23, 2022

(54) BIFURCATING MARINE MOTOR FRESH WATER FLUSH SYSTEM AND METHOD OF USE

(71) Applicant: Carlos Alonso, Hollywood, FL (US)

(72) Inventor: Carlos Alonso, Hollywood, FL (US)

( * ) Notice: Subject to any disclaimer, the term of this patent is extended or adjusted under 35 U.S.C. 154(b) by 110 days.

(21) Appl. No.: 16/910,005

(22) Filed: Jun. 23, 2020

Related U.S. Application Data

(60) Provisional application No. 62/939,008, filed on Nov. 22, 2019.

(51) Int. Cl.
  *F01P 3/20* (2006.01)
  *B63H 21/38* (2006.01)
  *B63H 20/00* (2006.01)

(52) U.S. Cl.
  CPC ............ *F01P 3/205* (2013.01); *B63H 21/383* (2013.01); *B63H 2020/003* (2013.01)

(58) Field of Classification Search
  CPC ..................... B63H 21/383; B63H 2020/003
  See application file for complete search history.

(56) References Cited

U.S. PATENT DOCUMENTS

| | | | |
|---|---|---|---|
| 4,293,031 A | 10/1981 | Babish | |
| 5,350,329 A | 9/1994 | Haman | |
| 5,362,265 A | 11/1994 | Gervias | |
| 6,776,677 B1 | 8/2004 | Knapp, Jr. | |
| 2007/0063165 A1* | 3/2007 | Hampton, Sr. | F16K 27/067 251/315.01 |
| 2007/0105464 A1 | 5/2007 | Vasilaros | |
| 2009/0029609 A1 | 1/2009 | Breece et al. | |

OTHER PUBLICATIONS

Twinkle Hose End Adapter, Retrieved from https://www.amazon.com/Twinkle-Star-Garden-Connector-TWIS3001/dp/B07CZYGVFH/ref=sr_1_7?keywords=hose+end+shut+off+valve&qid=1639701005&s=lawn-garden&sr=1-7, Retrieved Dec. 16, 2021, Offer for Sale in 2018 (Year: 2018).*
2Wayz Hose Splitter, Retrieved from https://www.amazon.com/2wayz-Metal-Garden-Splitter-Upgraded/dp/B019MS0HK8/ref=sr_1_5?crid=3LLBHSG5AO595&keywords=hose+splitter&qid=1639695367&sprefix=hose+splitt%2Caps%2C250&sr=8-5, retrieved Dec. 16, 2021, Offer for Sale in 2015 (Year: 2015).*
Link—"https://outboardst.com/product/power-purge-dual-cylinder-upgrade-kit/?gclid=EAlalQobChMlq-Hp9vKL6glVh5yzCh1Gogv-EAQYAiABEgLrmPD_BwE" Dated 2020.

* cited by examiner

*Primary Examiner* — Andrew Polay
(74) *Attorney, Agent, or Firm* — Allen D. Hertz, P.A.; Allen D. Hertz

(57) ABSTRACT

A bifurcating marine motor fresh water flush assembly comprising a wye having an inlet port and a manifold for distributing flow from the inlet port to each of a plurality of delivery ports. The wye further includes a valve for controlling flow through each delivery port. A supply line is connected to the inlet port. A delivery line connected to each delivery port. Each delivery line is connected to a flush port of a respective marine motor or an engine flusher. Flush water is provided to the inlet port, distributed to each open delivery port and forwarded to a respective marine motor to flush the motor accordingly. An engine flush intake adaptor assembly can be installed in each motor flush inlet connection, wherein a swivel connection of the adapter enables rotation when forming the union.

11 Claims, 7 Drawing Sheets

BIFURCATING MARINE MOTOR FRESH WATER FLUSH SYSTEM AND METHOD OF USE

This Non-Provisional patent application claims a domestic benefit of U.S. Provisional Patent Application Ser. No. 62/939,008, filed on Nov. 22, 2019, wherein the entirety of above the above application is incorporated herein by reference.

FIELD OF THE INVENTION

The present disclosure generally relates to a water flush delivery system for flushing marine motors. More particularly, the present disclosure relates to a bifurcating water flush delivery system for simultaneously flushing multiple marine motors.

BACKGROUND OF THE INVENTION

Power boats are powered by any of a number of power plant arrangements, including outboard motors, inboard engines, and inboard/outboard engines. Each of these commonly utilizes combustion engines. The combustion engines require cooling. Cooling can be provided by an enclosed (fresh water/coolant based) cooling system or an open cooling system. The enclosed (fresh water/coolant based) cooling system maintains the engine in a non-corrosive environment. Conversely, the open cooling system exposes the cooling ports within the engine and associated parts to water obtained from the operating environment. The externally sourced cooling water can be fresh water, brackish water, or salt water. The cooling water is collected through intakes located on a lower portion of the drive system, such as a lower unit of an outboard motor or an outdrive of an inboard/outboard motor. Alternatively, cooling water intakes or pickups can be mounted to a location on the hull that is below the waterline and exposed to water while the vessel is in motion.

Each of these natural sources of cooling water can accelerate corrosion throughout the cooling system. Fresh or brackish water commonly includes decomposing materials, run-off chemicals (such as fertilizers), animal excrements, sewage wastes, and the like; each of which can accelerate corrosion. To inhibit any potential of corrosion, the operator would flush each motor by running fresh water through the motor to remove any residual cooling water obtained from the environment.

One common arrangement for flushing a motor is to install a pair of flush muffs over the intake ports of the lower unit. A garden hose would be connected to the supply coupler of the flush muffs. The operator would initiate flow of water from a water source, such as by turning on a spigot. It is preferred that this step is completed prior to starting the motor being flushed, as the water provides lubrication to an impeller used to generate flow through the motor's cooling system. The operator would flush the motor over a desired period of time to remove the maximum amount of harmful residual from the environmentally sourced cooling water. This commonly takes several minutes. In certain arrangements, the motor would need to be run until it reaches operating temperature, where a thermostat would open, allowing the flush water to travel throughout and flush the entire cooling system.

Once the flush process is completed, the operator would turn the motor off, shut off the water supply, and remove the flush muffs from the lower unit.

This process is fairly straight forward for a vessel having a single motor. When flushing motors on a marine vessel having multiple motors, the operator repeats the flush steps for each motor in a serial process. Replicating the flush process in a serial manner multiplies the time required for the overall process of flushing all of the multiple motors.

In an alternative arrangement, newer outboard motors include a dedicated flush intake port. The flush intake ports are a fixed female coupler. The fixed female coupler inhibits the process of connecting a free, male connection end of the water supply hose to the fixed female connector.

A solution that reduces the overall time for flushing all of the multiple motors is desired.

A method of improving the step of connecting the water supply hose to the fixed female coupler is also desired.

Garden hoses connect using a male/female thread connection. The technical term for this arrangement is a "hose union". Spigots or sillcocks have male hose connectors only, and the mating end of a hose has a captive nut which fits the threads there.

The thread standard for garden hose connectors in the United States, its territories, and Canada is known colloquially as "garden hose thread" (GHT), but its official designation is NH (NH stands for "National Hose"; ¾-11.5NH is for full form threads as produced by cutting material such as the brass spigot outlet or hose male or female end fitting found on more expensive hoses; ¾-11.5NHR is for thin-walled couplers produced by rolling thin material, usually brass, typically found on less expensive hoses; ¾-14NPSH is for female hose ends that mate a hose to a tapered pipe thread without a spigot). The standard was defined by NFPA 1963, "Standard for Fire Hose Connections", then later by ANSI-ASME B1.20.7, which is 1¹/₁₆ inches (27 mm) diameter straight (non-tapered) thread with a pitch of 11.5 threads per inch (TPI). The female thread is abbreviated FHT, and the male part is abbreviated MHT. This fitting is used with ½-inch, ⅝-inch, and ¾-inch hoses.

In other countries, a British Standard Pipe (BSP) thread is used, which is ¾ inch (19 mm) and 14 TPI (male part outside diameter is 26.441 mm or 1.04 in). The GHT and BSP standards are not compatible, and attempting to connect a GHT hose to a BSP fitting, or vice versa, will damage the threads.

Various adaptors made of metal or plastic are available to interconnect GHT, BSP, NPT, hose barb, and quick connect fittings.

SUMMARY OF THE INVENTION

The present disclosure is generally directed to a bifurcating marine motor fresh water flush system for use in flushing multiple motors of a water vessel.

In a first aspect, the bifurcating marine motor fresh water flush system may include:
 a wye comprising:
  an inlet port,
  a distribution conduit,
  at least two distribution branches, and
  at least two flow control valves, each flow control valve arranged within the wye where the flow control valve controls discharge of fluid from the respective distribution branch of the at least two distribution branches,
 a flexible supply hose having a first end coupled to the inlet port of the wye a connection coupled to a second, opposite end; and at least two flexible delivery hoses, each flexible delivery hose having a first end coupled to a distribution end of the respective distribution branch of the at least two distribution branches and a connection coupled to a second, opposite end.

In a second aspect, the bifurcating marine motor fresh water flush system further comprises a supply hose connected to the inlet port of the wye.

In another aspect, the supply hose is connected to the inlet port of the wye using a threaded connection.

In yet another aspect, the supply hose is connected to the inlet port of the wye using a male-female threaded connection.

In yet another aspect, the male threaded section is provided on the associated end of the supply hose and the female threaded connection is a female thread swivel connection provided on the associated end of the wye.

In yet another aspect, the supply hose further comprises a swivel female connection assembled to a free end of the supply hose.

In yet another aspect, a swivel female connector is integral with the inlet port of the wye.

In yet another aspect, wherein the connection coupled to the second, opposite end of the flexible supply hose is a female thread swivel connection.

In yet another aspect, wherein the connection coupled to the second, opposite end of the flexible supply hose is a male quick disconnect connector. One exemplary quick disconnect is a POWER CARE Garden Hose Quick-Connect Kit Model #AP31084. Another exemplary quick disconnect is a MELNOR Quick-Connect Kit Model #237-337. In yet another aspect, the wye includes at least three (3) distribution branches, at least three (3) flow control valves, and at least three (3) flexible delivery hoses.

In yet another aspect, the wye includes at least four (4) distribution branches, at least four (4) flow control valves, and at least four (4) flexible delivery hoses.

In yet another aspect, the wye includes at least five (5) distribution branches, at least five (5) flow control valves, and at least five (5) flexible delivery hoses.

In yet another aspect, the wye includes at least six (6) distribution branches, at least six (6) flow control valves, and at least six (6) flexible delivery hoses.

In yet another aspect, the wye includes at least n distribution branches, at least n flow control valves, and at least n flexible delivery hoses, where n is any reasonable quantity.

In yet another aspect, the wye includes two (2) distribution branches, two flow control valves, and two flexible delivery hoses.

In yet another aspect, the wye includes three (3) distribution branches, three (3) flow control valves, and three (3) flexible delivery hoses.

In yet another aspect, the wye includes four (4) distribution branches, four (4) flow control valves, and four (4) flexible delivery hoses.

In yet another aspect, the wye includes five (5) distribution branches, five (5) flow control valves, and five (5) flexible delivery hoses.

In yet another aspect, the wye includes six (6) distribution branches, six (6) flow control valves, and six (6) flexible delivery hoses.

In yet another aspect, the first (supply) end of each flexible delivery hose of the at least two flexible delivery hoses and the distribution end of the respective distribution branch of the at least two distribution branches of the wye are connected to one another using a threaded connection.

In yet another aspect, the first (supply) end of each flexible delivery hose of the at least two flexible delivery hoses and the distribution end of the respective distribution branch of the at least two distribution branches of the wye are connected to one another using a male-female threaded connection.

In yet another aspect, the male threaded section is provided on the associated end of the wye and the female threaded connection is a female thread swivel connection provided on the associated (supply) end of the flexible delivery hose.

In yet another aspect, each flexible delivery hose further comprises a threaded connection assembled to a free (delivery) end of the flexible delivery hose.

In yet another aspect, each flexible delivery hose further comprises a male threaded connection assembled to a free (delivery) end of the flexible delivery hose.

In yet another aspect, each flexible delivery hose further comprises a quick disconnect connector assembled to a free (delivery) end of the flexible delivery hose.

In yet another aspect, a swivel female connector is integral with each distribution branch of the at least two distribution branches of the wye.

In yet another aspect, a body of the wye includes the distribution conduit and each distribution branch of the at least two distribution branches.

In yet another aspect, a body of the wye is manufactured of metal.

In yet another aspect, a body of the wye is manufactured of chrome plated metal.

In yet another aspect, a body of the wye is manufactured of brass.

In yet another aspect, the body of the wye is manufactured of steel.

In yet another aspect, the body of the wye is manufactured of zinc.

In yet another aspect, the body of the wye is manufactured of plastic.

In yet another aspect, each flow control valve of the at least two flow control valves is a globe valve. The globe valve can provide variable flow control.

In yet another aspect, each flow control valve of the at least two flow control valves is a gate valve. The gate valve can provide digital or On-Off flow control.

In yet another aspect, each flow control valve of the at least two flow control valves is a ball valve. The ball valve can provide variable flow control.

In yet another aspect, each flow control valve of the at least two flow control valves is a lever controlled valve. The lever controlled valve can provide digital or On-Off flow control.

In yet another aspect, the bifurcating marine motor fresh water flush system further comprises at least one flush water swivel adaptor hose assembly assembled to the free (delivery) end of a respective flexible delivery hose.

In yet another aspect, a first (supply) end of each at least one flush water swivel adaptor hose assembly and the distribution end of the respective flexible delivery hose are connected to one another using a threaded connection.

In yet another aspect, the first (supply) end of each at least one flush water swivel adaptor hose assembly and the distribution end of the respective flexible delivery hose are connected to one another using a male-female threaded connection.

In yet another aspect, a first (supply) end of each at least one flush water swivel adaptor hose assembly and the distribution end of the respective flexible delivery hose are connected to one another using a quick connect connection.

In yet another aspect, the bifurcating marine motor fresh water flush system further comprises a first quick connect connection assembled to the first (supply) end of each at least one flush water swivel adaptor hose assembly and a second, mating quick connect connection assembled to the distribution end of the respective flexible delivery hose, the first quick connect connection and the second, mating quick connect connection are connected to one another using the quick connect connection.

In yet another aspect, the first (supply) end of each at least one flush water swivel adaptor hose assembly and the distribution end of the respective flexible delivery hose are connected to one another using a male-female quick connect connection.

In yet another aspect, the bifurcating marine motor fresh water flush system further comprises a male quick connect connection assembled to the first (supply) end of each at least one flush water swivel adaptor hose assembly and a female quick connect connection assembled to the distribution end of the respective flexible delivery hose, the male quick connect connection and the female quick connect connection are connected to one another using the male-female quick connect connection.

In yet another aspect, the bifurcating marine motor fresh water flush system further comprises a female quick connect connection assembled to the first (supply) end of each at least one flush water swivel adaptor hose assembly and a male quick connect connection assembled to the distribution end of the respective flexible delivery hose, the female quick connect connection and the male quick connect connection are connected to one another using the male-female quick connect connection.

In yet another aspect, each of the at least one flush water swivel adaptor hose assembly further comprises a threaded connection assembled to a free (delivery) end of the respective flush water swivel adaptor hose assembly.

In yet another aspect, each of the at least one flush water swivel adaptor hose assembly further comprises a male threaded connection assembled to the free (delivery) end of the flush water swivel adaptor hose assembly.

In yet another aspect, each of the at least one flush water swivel adaptor hose assembly further comprises a female threaded connection assembled to the free (delivery) end of the flush water swivel adaptor hose assembly.

In yet another aspect, each flush water swivel adaptor hose assembly further comprises a quick disconnect connector assembled to a free (delivery) end of the flush water swivel adaptor hose assembly.

In an enhanced variant, the bifurcating marine motor fresh water flush system may include:
an engine flush intake adaptor assembly comprising:
an engine flush intake adaptor body,
a male threaded connection provided at a delivery (installation) end of the engine flush intake adaptor body,
a swivel female threaded connection provided at a supply (source) end of the engine flush intake adaptor body,
an engine flush intake adaptor valve subassembly located between the male threaded connection and the swivel female threaded connection; and
a flush water delivery system comprising:
a fluid conduit having a first (supply) end connection having a configuration enabling water tight connectivity to a water supply source and a second, free (delivery) end connection having a configuration enabling water tight connectivity to the swivel female threaded connection of the engine flush intake adaptor assembly,
wherein the engine flush intake adaptor assembly is installed into a flush inlet port of a marine motor,
wherein during use and storage of the marine motor, the engine flush intake adaptor valve subassembly is positioned in a closed orientation,
wherein, during a process of flushing the marine motor, the first (supply) end connection is connected to a flush water source, the second, free (delivery) end connection is connected to the swivel female threaded connection of the engine flush intake adaptor assembly, and the engine flush intake adaptor valve subassembly is positioned in an open orientation,
wherein the flush water source is turned on, flowing water through the flush water delivery system and continuing through the engine flush intake adaptor body, flushing the marine motor.

In yet another aspect, the flush water delivery system further comprising:
a wye comprising:
an inlet port,
a distribution conduit,
at least two distribution branches, and
at least two flow control valves, each flow control valve arranged within the wye where the flow control valve controls discharge of fluid from the respective distribution branch of the at least two distribution branches,
a flexible supply hose having a first end coupled to the inlet port of the wye a connection coupled to a second, opposite end; and
at least two flexible delivery hoses, each flexible delivery hose having a first end coupled to a distribution end of the respective distribution branch of the at least two distribution branches and a connection coupled to a second, opposite end.

In yet another aspect, the marine vessel includes at least two motors.

In yet another aspect, the marine vessel includes at least two motors, each motor comprising a flush inlet connection.

In another aspect, each nth flexible delivery hose of the flush water delivery system is connected to a respective nth flush inlet connection of the nth marine motor of the at least two marine motors, with any excess flexible delivery hoses remaining disconnected.

In another aspect, each nth flow control valve in line with the nth flexible delivery hose connected to the nth marine motor is positioned into an open orientation and each flow control valve in line with a disconnected excess flexible delivery hose is positioned into a closed orientation.

In another aspect, minimum flow requirements are determined for the process to flush each marine motor. The minimum flow requirements and the flow rate from the flush water supply are used to calculate or determine the number of useable flexible delivery hoses. The respective quantity of flow control valves are positioned into an open orientation while the remaining flow control valves are positioned into a closed orientation. Each marine motor having flush water provided thereto is flushed. The process is repeated for each remaining marine motor or group of marine motors until all of the marine motors on the vessel are adequately flushed.

In another aspect, a marine engine flusher is employed to deliver flush water to the marine motor. The marine engine flusher includes a pair of marine engine flusher cups, each marine engine flusher cup being assembled to a respective free end of a marine engine flusher mounting frame. Flush water is delivered to one of the marine engine flusher cups.

In another aspect, the cooling systems of each marine motor are simultaneously flushed using a marine motor flusher to deliver flush water to each marine motor. In this arrangement, the flush process is accomplished while running each marine motor.

In another aspect, when flushing a marine motor using a running motor, the volumetric flow requirements are considered to ensure that sufficient volumetric flow is provided to each marine motor. The manifold branch flow control valves are oriented to provide sufficient volumetric flow to each marine motor being flushed. The orientation of the manifold branch flow control valves are toggled until each marine motor is flushed.

In another aspect, flush water provides at least two functions: (a) lubrication of an impeller installed within the lower unit of the motor or outdrive and (b) cleansing the cooling system of the marine motor.

In another aspect, the flush water manifold assembly can further comprise a manifold distribution branch identifier, the manifold distribution branch identifier providing a unique reference for each manifold distribution branch.

In another aspect, the manifold distribution branch identifier can be one of: a numeric character, a numeric character set, an alphabetical character, an alphabetical character set, an alpha-numeric character set, a shaped object, a color coding, and the like. The manifold distribution branch identifier aids the user in identifying the branch and valve associated with each respective outboard motor of the water vessel.

In yet another aspect, the present invention discloses a method of use for flushing at least two marine motors rigged upon a marine vessel, the method comprising steps of:
  obtaining a bifurcating marine motor fresh water flush assembly, the bifurcating marine motor fresh water flush assembly comprising:
    a wye comprising:
      an inlet port,
      a distribution conduit,
      at least two distribution branches, and
      at least two flow control valves, each flow control valve arranged within the wye where the flow control valve controls discharge of fluid from the respective distribution branch of the at least two distribution branches,
    a flexible supply hose having a first end coupled to the inlet port of the wye a connection coupled to a second, opposite end; and
    at least two flexible delivery hoses, each flexible delivery hose having a first end coupled to a distribution end of the respective distribution branch of the at least two distribution branches and a connection coupled to a second, opposite end;
  connecting the connection coupled to a second, opposite end of the flexible supply hose to a flush water source (spigot);
  connecting each nth flexible delivery hose of the flush water delivery system to a respective nth flush inlet connection of an nth marine motor of the at least two marine motors, with any excess flexible delivery hoses remaining disconnected;
  placing each respective flow control valve associated with each flexible delivery hose connected to a respective marine motor into an open orientation;
  placing each respective flow control valve associated with each excess flexible delivery hoses remaining disconnected into a closed orientation;
  initiating flow of flush water from the flush water source (spigot);
  activating a flush process associated with each marine motor; and
  continuing the flush process until the flush process is completed.

In yet another aspect, the present invention discloses a method of use for flushing at least two marine motors rigged upon a marine vessel, the method comprising steps of:
  obtaining a bifurcating marine motor fresh water flush assembly, the bifurcating marine motor fresh water flush assembly comprising:
    a wye comprising:
      a wye body,
      an inlet port integrally formed as part of the wye body,
      a distribution conduit integrally formed as part of the wye body,
      at least two distribution branches integrally formed as part of the wye body, and
      at least two flow control valves, each flow control valve of the at least two flow control valves are arranged within the wye body, where the flow control valve controls discharge of fluid from the respective distribution branch of the at least two distribution branches,
    a flexible supply hose having a first end coupled to the inlet port of the wye a connection coupled to a second, opposite end; and
    at least two flexible delivery hoses, each flexible delivery hose of the at least two flexible delivery hoses having a first end coupled to a distribution end of the respective distribution branch of the at least two distribution branches and a connection coupled to a second, opposite end;
  connecting the connection coupled to a second, opposite end of the flexible supply hose to a flush water source (spigot);
  placing each flow control valve of the at least two flow control valves into a closed orientation;
  connecting a selected flexible delivery hose of the at least two flexible delivery hoses of the flush water delivery system to a respective selected flush inlet connection of a respective marine motor of the at least two marine motors,
  repeating the step of connecting another selected flexible delivery hose of the at least two flexible delivery hoses of the flush water delivery system to another respective selected flush inlet connection of another respective marine motor of the at least two marine motors until each marine motor of the at least two marine motors has a flexible delivery hose of the at least two flexible delivery hoses of the flush water delivery system connected thereto, with any excess flexible delivery hoses remaining disconnected;
  placing at least one flow control valve controlling fluid flow with the respective flexible delivery hose connected to the respective marine motor into an open orientation;
  initiating flow of flush water from the flush water source (spigot);
  activating a flush process associated with each marine motor; and
  continuing the flush process until the flush process is completed.

In yet another aspect, the method further comprises a step of placing at least a second flow control valve controlling fluid flow with the second respective flexible delivery hose connected to the second respective second marine motor into an open orientation.

In yet another aspect, the method further comprises a step of placing all flow control valves controlling fluid flow with each respective flexible delivery hose connected to each respective second marine motor into an open orientation, while retaining flow control valves controlling fluid flow with each excess flexible delivery hose remaining disconnected in a closed orientation.

In yet another aspect, each flexible delivery hose of the at least two flexible delivery hoses further comprising an element having a swivel function located proximate the second, opposite end, the method further comprises a step of utilizing the swivel function of each respective to maintain a rotational orientation of the respective flexible delivery hose of the at least two flexible delivery hoses during rotational assembly of the connection coupled to a second, opposite end of the respective flexible delivery hose of the at least two flexible delivery hoses.

In yet another aspect, each flexible delivery hose of the at least two flexible delivery hoses further comprising a female swivel connector assembled to the second, opposite end, the method further comprises a step of installing a male to male threaded adapter between the female swivel connector assembled to the second, opposite end of the flexible delivery hose of the at least two flexible delivery hoses and the respective selected flush inlet connection of the respective marine motor of the at least two marine motors.

In yet another aspect, the method further comprises steps of:
  installing an engine flush intake adaptor assembly into each flush inlet connection of the respective marine motor of the at least two marine motors, the engine flush intake adaptor assembly comprising a first connector designed to mateably engage with the flush inlet connection of the respective marine motor, a second connector located on an opposite end of the engine flush intake adaptor assembly, and an engine flush intake adaptor valve controlling flow between the first connector and the second connector of the engine flush intake adaptor assembly;
  connecting the respective flexible delivery hose of the at least two flexible delivery hoses of the flush water delivery system to the respective selected flush inlet connection of the respective marine motor of the at least two marine motors; and
  positioning the engine flush intake adaptor valve in an open configuration providing flow between the first connector and the second connector of the engine flush intake adaptor assembly.

In yet another aspect, each flexible delivery hose of the at least two flexible delivery hoses further comprising a quick disconnect connector located proximate the second, opposite end,
  wherein the step of connecting a selected flexible delivery hose of the at least two flexible delivery hoses of the flush water delivery system to the respective selected flush inlet connection of the respective marine motor of the at least two marine motors is accomplished by coupling the quick disconnect connector located proximate the second, opposite end of the selected flexible delivery hose of the at least two flexible delivery hoses to a mating quick disconnect connector installed in the respective selected flush inlet connection of the respective marine motor of the at least two marine motors; and
  wherein the step of repeating the step of connecting another selected flexible delivery hose of the at least two flexible delivery hoses of the flush water delivery system to another respective selected flush inlet connection of another respective marine motor of the at least two marine motors is accomplished by coupling the quick disconnect connector located proximate the second, opposite end of the another selected flexible delivery hose of the at least two flexible delivery hoses to another mating quick disconnect connector installed in the respective selected flush inlet connection of the respective marine motor of the at least two marine motors until each marine motor of the at least two marine motors.

In yet another aspect, wherein the assembly of the at least two flexible delivery hoses, each flexible delivery hose of the at least two flexible delivery hoses having a first end coupled to a distribution end of the respective distribution branch of the at least two distribution branches and a connection coupled to a second, opposite end is completed by steps of:
  an end user fulfills the at least two flexible delivery hoses by selecting a set of at least two flexible delivery hoses wherein each a flexible delivery hose of the selected set of set of at least two flexible delivery hoses, has a length suitable for installation of the bifurcating marine motor fresh water flush assembly onto an arrangement of the at least two marine motors rigged upon the marine vessel;
  assembling a first end of each of the selected set of at least two flexible delivery hoses to the distribution end of the respective distribution branch of the at least two distribution branches of the wye.

In yet another aspect, the method further comprises a step of selecting an appropriate connector for use between the connection coupled to a second, opposite end of each flexible delivery hose of the at least two flexible delivery hoses, wherein the appropriate connector is selected from a group of appropriate connectors comprising:
  a) a male thread connection,
  b) a female swivel connector,
  c) a male to male threaded adapter,
  d) a quick disconnect connector, and
  e) a engine flush intake adaptor assembly;
  assembling the appropriate connector between the second, opposite end of each respective at flexible delivery hose of the at least two flexible delivery hoses and the respective selected flush inlet connection of a respective marine motor of the at least two marine motors.

In yet another aspect, the wye body further comprising a manifold distribution branch identifier, the manifold distribution branch identifier being a unique identifier associated with each respective distribution branch of the at least two distribution branches, the method further comprising steps of:
  associating each respective marine motor of the at least two marine motors with the respective manifold distribution branch and associated flow control valve of the at least two flow control valves by using the respective manifold distribution branch identifier.

In yet another aspect, wherein the flush inlet connection is provided as one of:
  a) integral with the respective marine motor of the at least two marine motors, or
  b) a connector assembled to a marine engine flusher assembly.

In yet another aspect, the method further comprises a step of terminating the flow of flush water from the flush water source (spigot).

In yet another aspect, the method further comprises a step of disconnecting each nth flexible delivery hose of the flush water delivery system from each respective nth flush inlet connection of each nth marine motor of the at least two marine motors.

In yet another aspect, the method further comprises a step of installing a flush intake adaptor assembly each nth marine motor of the at least two marine motors, each flush intake adaptor assembly comprising:
  an engine flush intake adaptor body,
  a male threaded connection provided at a delivery (installation) end of the engine flush intake adaptor body,
  a swivel female threaded connection provided at a supply (source) end of the engine flush intake adaptor body, and
  an engine flush intake adaptor valve subassembly located between the male threaded connection and the swivel female threaded connection; and
  connecting each nth flexible delivery hose of the flush water delivery system to a respective nth swivel female threaded connection of the engine flush intake adaptor valve subassembly installed in the nth marine motor of the at least two marine motors, with any excess flexible delivery hoses remaining disconnected.

In an alternative method, the flush process employs a flush intake adaptor assembly. The alternative method includes a step of installing a flush intake adaptor assembly in a flush intake port of each marine motor of at least two marine motors, each flush intake adaptor assembly comprising:
  an engine flush intake adaptor body,
  a male threaded connection provided at a delivery (installation) end of the engine flush intake adaptor body,
  a swivel female threaded connection provided at a supply (source) end of the engine flush intake adaptor body, and
  an engine flush intake adaptor valve subassembly located between the male threaded connection and the swivel female threaded connection;
  the method further comprising steps of:
  connecting a flush water delivery end of a flush water delivery system to the swivel female threaded connection of a respective engine flush intake adaptor valve subassembly installed in the respective marine motor;
  connecting a supply (opposite) end of the flush water delivery system to a flush water supply (spigot);
  orienting the engine flush intake adaptor valve subassembly in an open orientation;
  initiating flow from the flush water supply source (spigot), completing a process of flushing each marine motor.

In yet another aspect, the marine vessel includes at least two marine motors, the method further comprising a step of repeating the process for each of at least two marine motors.

In yet another aspect, the marine vessel includes at least two marine motors,
  the flush water delivery system further comprising:
    a wye comprising:
      an inlet port,
      a distribution conduit,
      at least two distribution branches, and
      at least two flow control valves, each flow control valve arranged within the wye where the flow control valve controls discharge of fluid from the respective distribution branch of the at least two distribution branches,
    a flexible supply hose having a first end coupled to the inlet port of the wye a connection coupled to a second, opposite end; and
    at least two flexible delivery hoses, each flexible delivery hose having a first end coupled to a distribution end of the respective distribution branch of the at least two distribution branches and a connection coupled to a second, opposite end.
  the method further comprising steps of:
  connecting each nth flexible delivery hose of the flush water delivery system to a respective nth flush inlet connection of the nth marine motor of the at least two marine motors, with any excess flexible delivery hoses remaining disconnected;
  orienting each flow control valve of each nth flexible delivery hose connected to a respective nth marine motor of the at least two marine motors in an open orientation;
  orienting each flow control valve of each excess (disconnected) flexible delivery hose in a closed orientation;
  delivering flush water to each nth marine motor of the at least two marine motors simultaneously;
  activating a flush process associated with each marine motor of the at least two marine motors; and
  continuing the flush process with each marine motor of the at least two marine motors until determining that the flush process is completed.

In yet another aspect, the present invention discloses a method of use for flushing at least two marine motors rigged upon a marine vessel, the method comprising steps of:
  obtaining a bifurcating marine motor fresh water flush assembly, the bifurcating marine motor fresh water flush assembly comprising:
    a wye comprising:
      an inlet port,
      a distribution conduit,
      at least two distribution branches, and
      at least two flow control valves, each flow control valve arranged within the wye where the flow control valve controls discharge of fluid from the respective distribution branch of the at least two distribution branches,
    a flexible supply hose having a first end coupled to the inlet port of the wye a connection coupled to a second, opposite end; and
    at least two flexible delivery hoses, each flexible delivery hose having a first end coupled to a distribution end of the respective distribution branch of the at least two distribution branches and a connection coupled to a second, opposite end;
  connecting the connection coupled to a second, opposite end of the flexible supply hose to a flush water source (spigot);
  connecting each nth flexible delivery hose of the flush water delivery system to a respective nth marine engine flusher;
  placing each marine engine flusher onto each lower unit of an nth marine motor of the at least two marine motors, locating marine engine flusher cups of the marine engine flusher covering the nth motor lower unit cooling water intake ports, with any excess flexible delivery hoses remaining disconnected;
  placing each respective flow control valve associated with each flexible delivery hose connected to a respective marine motor into an open orientation;

placing each respective flow control valve associated with each excess flexible delivery hoses remaining disconnected into a closed orientation;

initiating flow of flush water from the flush water source (spigot);

activating a flush process associated with each marine motor; and continuing the flush process until determining that the flush process is completed.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, in which.

Like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 5:
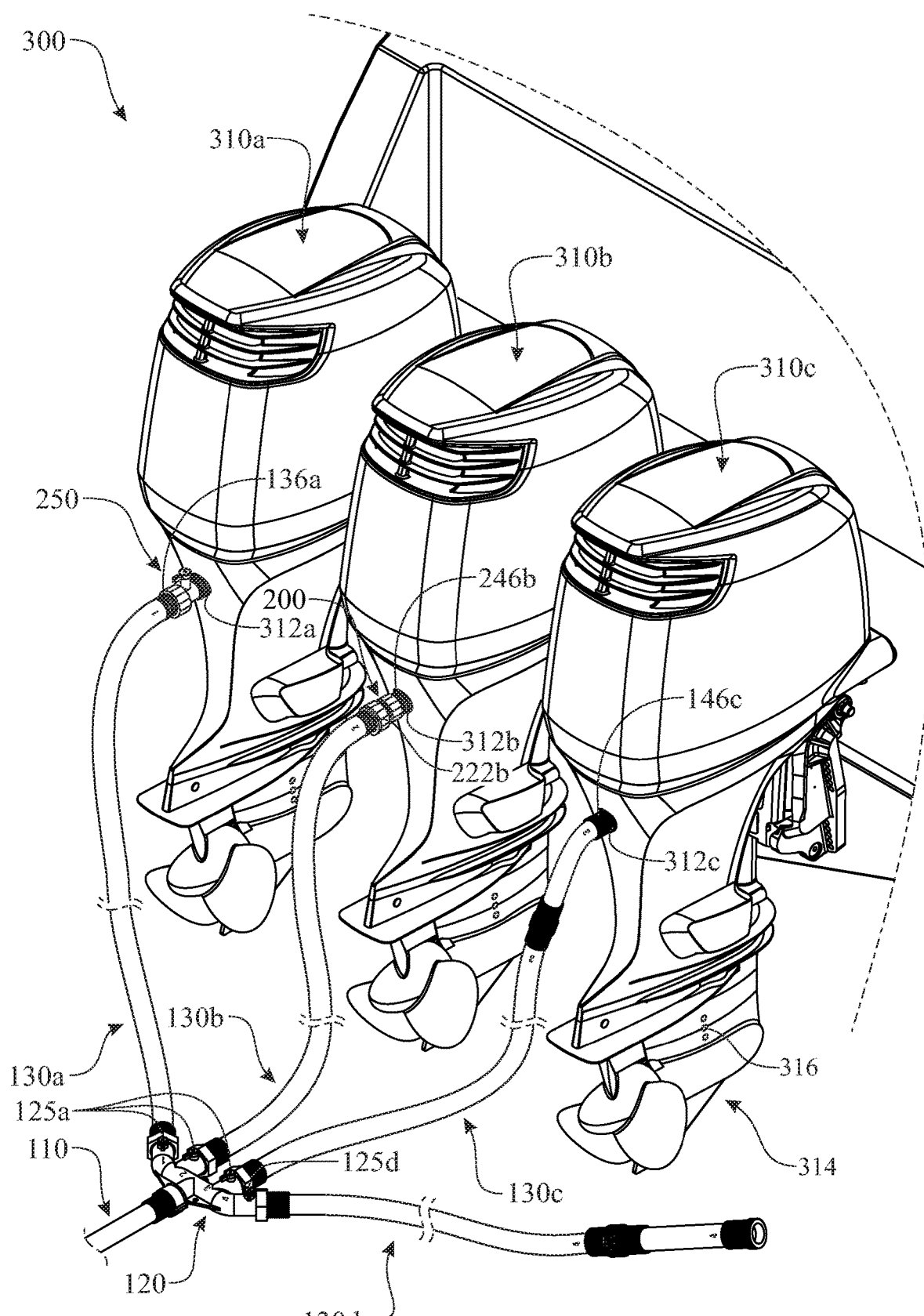
FIG. 5 presents an isometric rear, top view of a tri-powered marine vessel employing the exemplary bifurcating marine engine fresh water flush system introduced in FIG. 1 and the exemplary engine flush intake adaptor assembly introduced in FIG. 4.

Marine vessels, such as the exemplary multi-powered water vessel 300 introduced in FIG. 5, are commonly rigged with multiple marine motors, such as a port outboard motor 310*a*, a center outboard motor 310*b*, and a starboard outboard motor 310*c*, as illustrated. Each of the marine motors 310*a*, 310*b*, 310*c* can be configured having an enclosed cooling system or an open cooling system. The exemplary marine motors 310*a*, 310*b*, 310*c* are configured having an open cooling system, utilizing environmentally provided water for cooling the motors 310*a*, 310*b*, 310*c*. Cooling water enters through outboard motor lower unit cooling water intake ports 316 integral with an outboard motor lower unit 314 of each marine motor 310*a*, 310*b*, 310*c*. Cooling water, obtained from the environment, would enter through the series of outboard motor lower unit cooling water intake ports 316, pass through the cooling system of the marine motor 350*a*, 350*b*, 350*c*, and be discharged back into the environment. The environmentally provided cooling water can be fresh water, brackish water, or salt water. Each of these can enhance corrosion of the cooling system within the marine motor 310*a*, 310*b*, 310*c*. To hinder any potential for corrosion, each marine motor 310*a*, 310*b*, 310*c* is flushed by passing fresh water through the cooling system over an adequate period of time. An adequate period of time can be approximately 3-5 minutes per marine motor 310*a*, 310*b*, 310*c*, plus time required for installing the flush mechanism and removal of the flush mechanism from each marine motor 310*a*, 310*b*, 310*c*.

Figure 1:
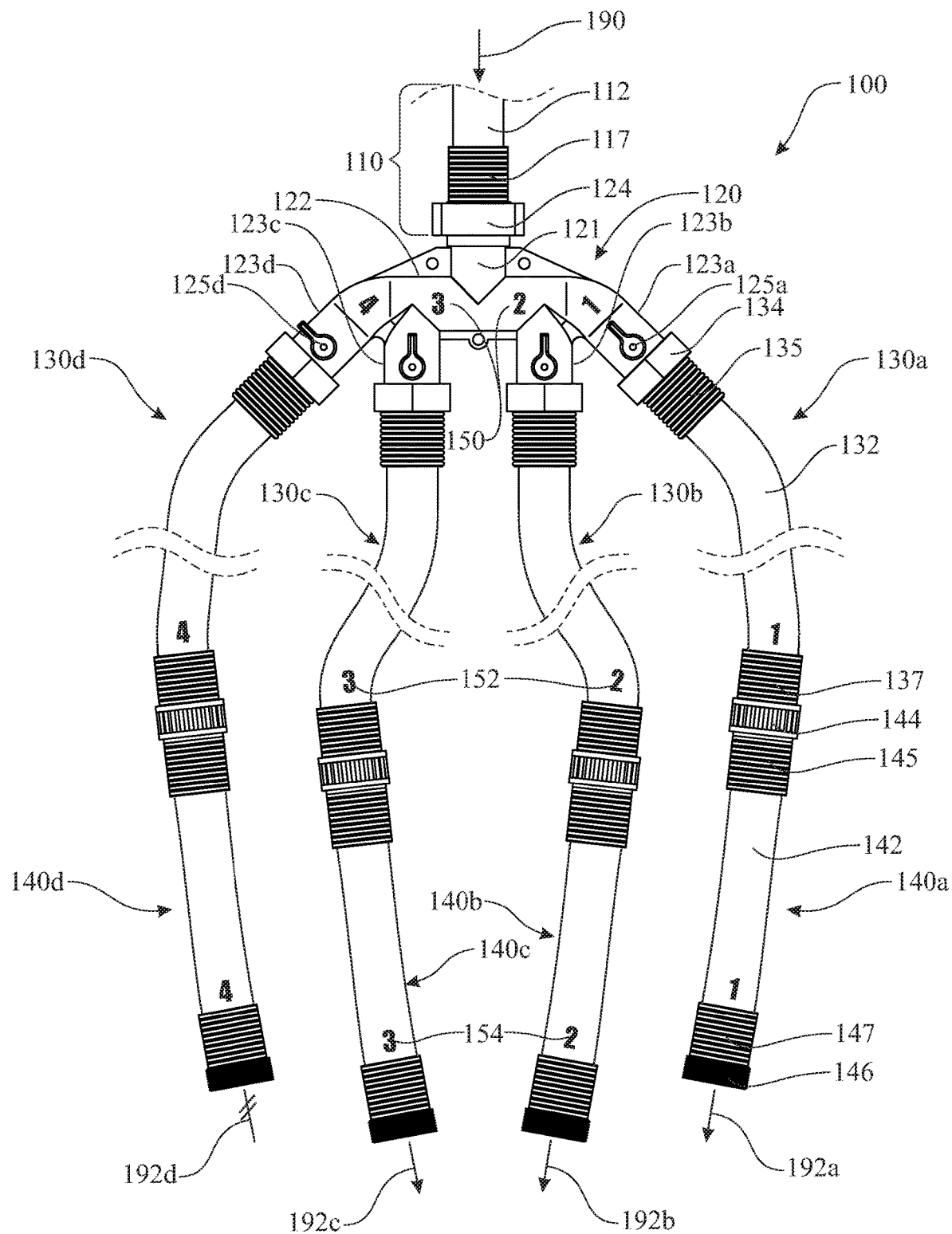
FIG. 1 presents a plan top view of an exemplary bifurcating marine engine fresh water flush system.
Figure 2:
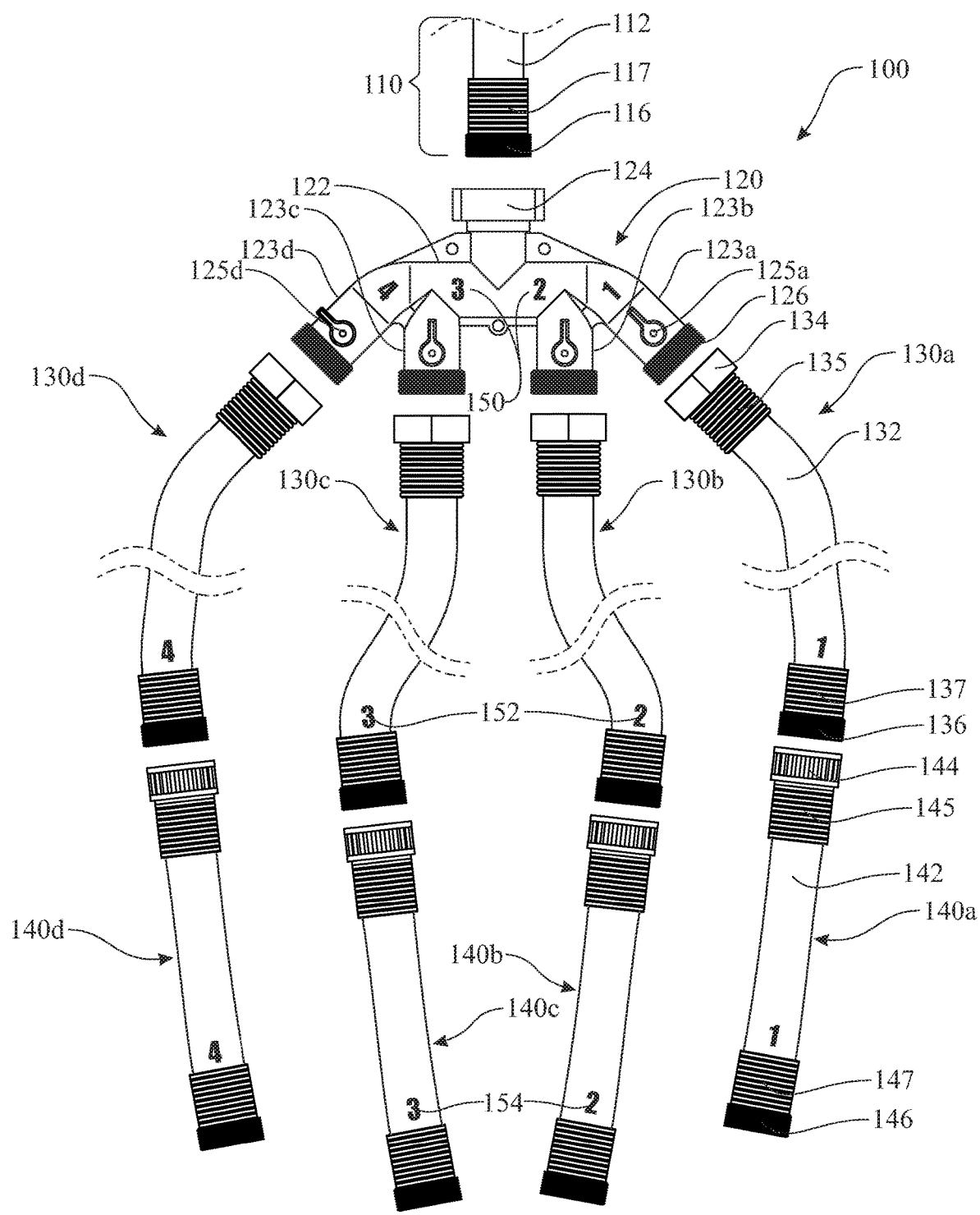
FIG. 2 presents a plan top exploded assembly view of the exemplary bifurcating marine engine fresh water flush system introduced in FIG. 1.

The present invention is generally directed towards a bifurcating marine engine fresh water flush system 100, as illustrated in FIGS. 1, 2, and 5. The bifurcating marine engine fresh water flush system 100 is presented in an assembled view in FIG. 1 and an exploded assembly view in FIG. 2 to better identify each connection component. The bifurcating marine engine fresh water flush system 100 enables execution of the flush process for flushing two or more marine motors 310*a*, 310*b*, 310*c* simultaneously, thus reducing the overall time for preparing the marine vessel for storage.

The bifurcating marine engine fresh water flush system 100 can be described using three separate sections: a supply section having a flush water supply arrangement 110, a distribution and flow control section utilizing a flush water manifold assembly (wye) 120, and a delivery section including a plurality of flush water delivery hose assemblies, identified as each of a first flush water delivery hose assembly 130*a*, a second flush water delivery hose assembly 130*b*, third flush water delivery hose assembly 130*c* and a fourth flush water delivery hose assembly 130*d*. Each section is detailed as follows:

The supply section includes a flush water supply arrangement 110 comprising a flush water supply hose male thread connection 116 assembled to a flush water supply hose 112 by a flush water supply hose male connection hose attachment 117. The flush water supply hose 112 can further include a swivel female threaded connection or a quick disconnect on an opposite end, where the respective connection would be a mate for a connector provided on a spigot or other flush water source (not shown but well understood by those skilled in the art). Although the exemplary illustration presents a flush water supply hose male thread connection 116 assembled to a wye connection end of the flush water supply hose 112, it is understood that a swivel male threaded connection, a female threaded connection, a swivel female threaded connection, a male quick connect connection, or a female quick connect connection can be assembled to a wye connection end of the flush water supply hose 112, where the configuration of the connection would be a mating connection compatible with the connection provided on an inlet port of the flush water manifold assembly (wye) 120. The flush water supply arrangement 110 can be a garden hose provided by the user or an independent flush water supply arrangement 110 that is of a length enabling a connection directly to the spigot or when the flush water supply arrangement 110 is not sufficient in length, connected to the spigot by connecting a garden hose between the flush water supply arrangement 110 and the spigot.

The flush water manifold assembly (wye) 120 includes a source or inlet port (identified by a manifold female thread swivel connection 124) and a plurality of delivery ports, identified, for example, as an opening or port at located at a manifold male thread connection 126. The flush water manifold assembly (wye) 120 is manufactured having a supply conduit 121 extending in a first direction from a manifold body 122, and a plurality of manifold distribution branch 123a, 123b, 123c, 123d extending in a section direction from the manifold body 122. The supply conduit 121, the manifold body 122, and each of the plurality of manifold distribution branch 123a, 123b, 123c, 123d are arranged to receive the flush water through the inlet port and using the manifold body 122 to divide the flush water from the supply conduit 121, delivering a portion of the flush water to each of the manifold distribution branch 123a, 123b, 123c, 123d. In one embodiment, the flush water manifold assembly (wye) 120 is fabricated having the supply conduit 121, the manifold body 122 and each of the plurality of using a manifold distribution branch 123a, 123b, 123c, 123d formed as a single structure or a single body. The flush water manifold assembly (wye) 120 having the single body can be fabricated using a casting process, a machining process, a forging process, a molding process, and the like. The flush water manifold assembly (wye) 120 having the single body can be fabricated of aluminum, brass, zinc, cast metal, brass, copper, and the like. The exemplary flush water manifold assembly (wye) 120 is illustrated including four (4) distribution or delivery branches 123a, 123b, 123c, 123d. It is understood that the flush water manifold assembly (wye) 120 can include at least two (2) distribution or delivery branches 123a, 123b; at least three (3) distribution or delivery branches 123a, 123b, 123c; at least four (4) distribution or delivery branches 123a, 123b, 123c, 123d; at least five (5) distribution or delivery branches 123a, 123b, 123c, 123d, and an additional branch (not illustrated); at least six (6) distribution or delivery branches 123a, 123b, 123c, 123d, and two (2) additional branches (not illustrated); or at least n distribution or delivery branches 123a, 123b, 123c, 123d, and n additional branches (not illustrated), where n refers to any reasonable number. It is also understood that the flush water manifold assembly (wye) 120 can include two (2) distribution or delivery branches 123a, 123b; three (3) distribution or delivery branches 123a, 123b, 123c; four (4) distribution or delivery branches 123a, 123b, 123c, 123d; five (5) distribution or delivery branches 123a, 123b, 123c, 123d, and an additional branch (not illustrated); six (6) distribution or delivery branches 123a, 123b, 123c, 123d, and two (2) additional branches (not illustrated); or n distribution or delivery branches 123a, 123b, 123c, 123d, and n additional branches (not illustrated), where n refers to any reasonable number.

A manifold branch flow control valve (shown in an open orientation) 125a, (shown in a closed orientation) 125d is integrated into each respective distribution or delivery branch 123a, 123b, 123c, 123d. The manifold branch flow control valve 125a, 125d can be of any suitable type of valve, including a globe valve, a gate valve, a ball valve, a lever controlled valve, or any other suitable valve. The globe valve and the ball valve can provide variable flow control. The gate valve and the lever controlled valve can provide digital or On-Off flow control.

A flush water delivery hose assembly 130a, 130b, 130c, 130d is connected to the flush water manifold assembly (wye) 120 via a connection (such as a 126a illustrated in FIG. 2) at the opening or delivery port of each respective distribution or delivery branch 123a, 123b, 123c, 123d thereof. Each flush water delivery hose assembly 130a, 130b, 130c, 130d is fabricated including a flush water delivery hose 132; a flush water delivery hose female thread swivel connection 134 assembled to a supply end of the flush water delivery hose 132 using a flush water delivery hose female swivel connection hose attachment 135 and a flush water delivery hose male thread connection 136 assembled to a delivery end of the flush water delivery hose 132 using a flush water delivery hose male connection hose attachment 137. Each flush water delivery hose 132 is preferably fabricated of a length of a flexible hose, such as a garden hose. The flush water delivery hose 132 would be of a length enabling connectivity of the delivery end to each flush water delivery hose 132 to each respective marine motor 310a, 310b, 310c, while retaining connectivity of each flush water delivery hose 132 to the flush water manifold assembly (wye) 120. The flush water delivery hose 132 can be of a custom length designed for a specific rigging or arrangement of marine motors. The releasable connection configuration between the supply end of the flush water delivery hose 132 and the delivery end of each manifold branch enables assembly or an ability to exchange a flush water delivery hose 132 of a first length with a flush water delivery hose 132 of a different (shorter or longer) length to customize the bifurcating marine engine fresh water flush system 100 for a specific application. Although the exemplary illustration presents a flush water delivery hose female thread swivel connection 134 provided at the supply end of the flush water delivery hose 132, it is understood that the connection can be a swivel female thread connection (as shown), a male thread connection, a quick disconnect, a male quick disconnect, a female quick disconnect, or any other suitable connection configuration. Although the exemplary illustration presents a flush water delivery hose male thread connection 136 provided at the delivery end of the flush water delivery hose 132, it is understood that the connection can be a male thread connection (as shown), a swivel female thread connection, a quick disconnect, a male quick disconnect, a female quick disconnect, or any other suitable connection configuration. The respective selected connection configuration would be determined by the Application and mating connection configurations. The connections can utilize threaded connections having ¾-11.5 NH threading, ¾-14 NPSH threading, or any other suitable threaded connection. Alternatively, the connection can be or can be adapted to employ quick connectors, such as those invented by Hozelock, similar quick connectors manufactured by Gardena, and the like.

A manifold distribution branch identifier 150 can be provided on the flush water manifold assembly 120, the manifold distribution branch identifier 150 providing a unique reference for each manifold distribution branch 123*a*, 123*b*, 123*c*, 123*d*. The manifold distribution branch identifier 150 can be one of: a numeric character, a numeric character set, an alphabetical character, an alphabetical character set, an alpha-numeric character set, a shaped object, a color coding, and the like. The manifold distribution branch identifier 150 aids the user in identifying the manifold distribution branch 123*a*, 123*b*, 123*c*, 123*d* and valve 125*a*, 125*d* associated with each respective outboard motor 310*a*, 310*b*, 310*c* of the water vessel 300, 302. The manifold distribution branch identifier 150 can be printed upon the flush water manifold assembly 120, integrally formed in the flush water manifold assembly 120, stamped into the flush water manifold assembly 120, applied upon the flush water manifold assembly 120 as a label, and the like.

Each flush water delivery hose assembly 130*a*, 130*b*, 130*c*, 130*d* can be identified by a flush water delivery hose assembly identifier 152. The flush water delivery hose assembly identifier 152 is preferably the same as the respective manifold distribution branch identifier 150. The flush water delivery hose assembly identifier 152 can be printed upon the flush water delivery hose assembly 130*a*, 130*b*, 130*c*, 130*d*, applied upon the flush water delivery hose assembly 130*a*, 130*b*, 130*c*, 130*d* as a label, and the like.

As mentioned above, a connection is provided at the opening or delivery port of each manifold distribution branch 123*a*, 123*b*, 123*c*, 123*d*. The connection can be a manifold male thread connection 126*a*, a swivel female thread connection, a quick disconnect, a male quick disconnect, a female quick disconnect, or any other suitable connection configuration. The connection configuration would be such to enable a water tight connection with a mating, supply connector of the flush water delivery hose assembly 130*a*, 130*b*, 130*c*, 130*d*.

An optional flush water swivel adaptor hose assembly 140*a*, 140*b*, 140*c*, 140*d* can be assembled to a delivery end of each respective flush water delivery hose assembly 130*a*, 130*b*, 130*c*, 130*d*.

Each flush water swivel adaptor hose assembly 140*a*, 140*b*, 140*c*, 140*d* is fabricated including a flush water swivel adaptor hose 142; a flush water swivel adaptor hose female thread swivel connection 144 assembled to a supply end of the flush water swivel adaptor hose 142 using a flush water swivel adaptor hose female swivel connection hose attachment 145 and a flush water swivel adaptor hose male thread connection 146 assembled to a delivery end of the flush water swivel adaptor hose 142 using a flush water swivel adaptor hose male connection hose attachment 147. Each flush water swivel adaptor hose 142 is preferably fabricated of a short length of a flexible hose, such as a garden hose. The flush water swivel adaptor hose 142 would be of a length where a user or operator can grip the flush water swivel adaptor hose 142 to rotate the flush water swivel adaptor hose 142 while threadably connecting the flush water swivel adaptor hose male thread connection 146 and a motor flush inlet connection 312*a*, 312*b*, 312*c* to one another. The releasable connection configuration between the supply end of the flush water swivel adaptor hose 142 and the delivery end of each flush water delivery hose 132 enables installation and/or removal of each flush water swivel adaptor hose assembly 140*a*, 140*b*, 140*c*, 140*d* to/from the bifurcating marine engine fresh water flush system 100, providing flexibility to the user or operator. Although the exemplary illustration presents a flush water swivel adaptor hose female thread swivel connection 144 provided at the supply end of the flush water swivel adaptor hose 142, it is understood that the connection can be a swivel female thread connection (as shown), a male thread connection, a quick disconnect, a male quick disconnect, a female quick disconnect, or any other suitable connection configuration. Since the flush water swivel adaptor hose assembly 140*a*, 140*b*, 140*c*, 140*d* is provided to enable a swivel motion between the connection at the respective flush water delivery hose assembly 130*a*, 130*b*, 130*c*, 130*d*, the connection provided at the delivery end of the flush water swivel adaptor hose 142 would normally be the male threaded connection. It is understood that the flush water swivel adaptor hose assembly 140*a*, 140*b*, 140*c*, 140*d* can be alternatively utilized as an adapter where the connector on the delivery end of the flush water delivery hose 132 is not compatible with the configuration of the connection of the motor flush inlet connection 312*a*, 312*b*, 312*c*. In that instance, the connection at the delivery end of the flush water swivel adaptor hose 142 can be a male thread connection (as shown), a swivel female thread connection, a quick disconnect, a male quick disconnect, a female quick disconnect, or any other suitable connection configuration that is compatible with the configuration of the connection of the motor flush inlet connection 312*a*, 312*b*, 312*c*.

Each flush water swivel adaptor hose assembly 140*a*, 140*b*, 140*c*, 140*d* can be identified by a flush water swivel adaptor hose assembly identifier 154. The flush water swivel adaptor hose assembly identifier 154 is preferably the same as the respective manifold distribution branch identifier 150. The flush water swivel adaptor hose assembly identifier 154 can be printed upon the flush water swivel adaptor hose assembly 140*a*, 140*b*, 140*c*, 140*d*, applied upon the flush water swivel adaptor hose assembly 140*a*, 140*b*, 140*c*, 140*d* as a label, and the like.

The connection configuration of the motor flush inlet connection 312*a*, 312*b*, 312*c* is commonly a fixed female threaded connection. This requires rotation of the supply hose. By introducing a swivel (such as the flush water swivel adaptor hose female thread swivel connection 144 illustrated in FIG. 2 and detailed in FIG. 3) into the flush water supply system, the swivel enables rotation between the connector and the balance of the supply hose.

Figure 3:
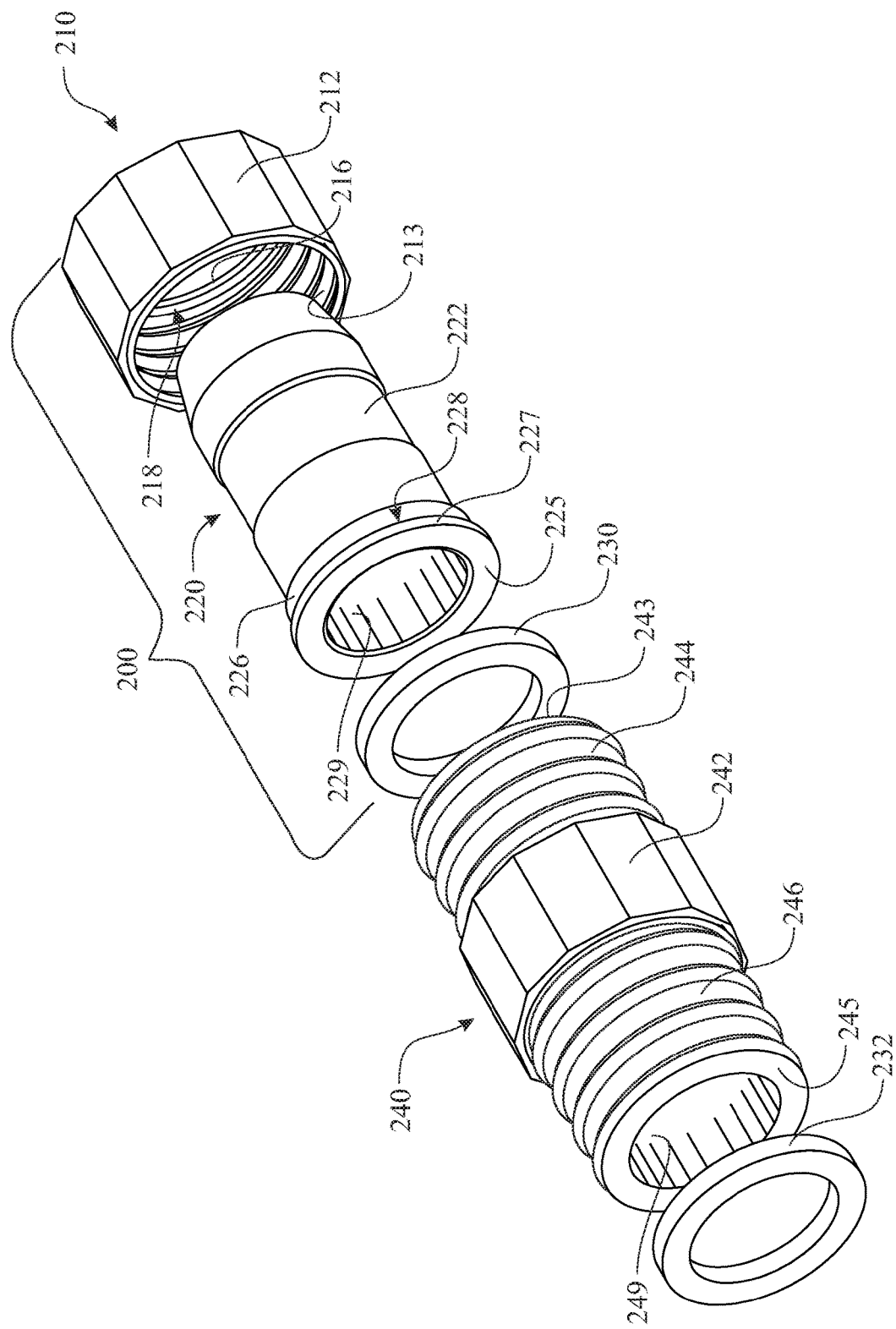
FIG. 3 presents an isometric top, side exploded assembly view of an exemplary swivel connector assembly.

An exemplary female hose swivel connector 200 is illustrated in an exploded assembly view presented in FIG. 3. The assembly of the female hose swivel connector 200 provides one example of details of an assembly between the flush water delivery hose 132, the flush water delivery hose female thread swivel connection 134, and the flush water delivery hose female swivel connection hose attachment 135. Similarly, the assembly of the female hose swivel connector 200 provides one example of details of an assembly between the flush water swivel adaptor hose 142, the flush water swivel adaptor hose female thread swivel connection 144, and the flush water swivel adaptor hose female swivel connection hose attachment 145. The exemplary illustrated additionally introduces an optional male to male threaded adapter 240 for providing fluid communication and connectivity between the bifurcating marine engine fresh water flush system 100 and a respective fixed female receptacle. Inclusion of the male to male threaded adapter 240 provides an alternative arrangement to the use of at least one of the flush water swivel adaptor hose assemblies 140*a*, 140*b*, 140*c*, 140*d*.

The threaded female hose swivel connector body 210 is fabricated including a threaded female hose swivel connector body threaded interior surface 213 provided about an interior surface of the threaded female hose swivel connector body 210. A threaded female hose swivel connector body swivel engaging flange 216 is included at one end of the threaded female hose swivel connector body 210. A threaded female hose swivel connector body swivel engaging surface 218 is provided on an interior side of the threaded female hose swivel connector body swivel engaging flange 216. The threaded female hose swivel connector body exterior surface 212 of the threaded female hose swivel connector body 210 can be formed to include an assembly assisting shape, such as a six-sided surface, an eight-sided surface, a twelve-sided surface (as illustrated), a knurled surface, and the like. Essentially, the threaded female hose swivel connector body exterior surface 212 can be any surface having any unsmooth and/or non-circular shaped cross section. A male to male threaded adapter exterior surface 242 of the male to male threaded adapter 240 can be can be formed to include an assembly assisting shape, such as a six-sided surface, an eight-sided surface, a twelve-sided surface (as illustrated), a knurled surface, and the like. Essentially, the male to male threaded adapter exterior surface 242 can be any surface having any unsmooth and/or non-circular shaped cross section.

The hose connecting member 220 is fabricated including a hose connecting member body interior surface 229 defining a bore passing therethrough and a hose connecting member body swivel flange 227 formed at one end of a hose connecting member body 222. The hose connecting member body 222 can be of any suitable shape to engage with and be retained within a pressurized hose, such as a rubber lined hose. One exemplary shape of the threaded female hose swivel connector body exterior surface 212 can include a series of differing diameters (as illustrated). Another exemplary shape of the threaded female hose swivel connector body exterior surface 212 can include multiple barbs extending radially outward from a central core. Each lead in edge can include a taper in the lead in direction. Each trailing end can be shaped to retain the hose from pulling forward. The hose connecting member body swivel flange 227 is of a size and shape enabling a hose connecting member body swivel flange seating surface 228 of the hose connecting member body swivel flange 227 to engage with and seat against the threaded female hose swivel connector body swivel engaging surface 218 of the threaded female hose swivel connector body swivel engaging flange 216. In one design, the hose connecting member body swivel flange seating surface 228 can be planar in shape; the threaded female hose swivel connector body swivel engaging surface 218 would be planar. In another design, the hose connecting member body swivel flange seating surface 228 can be planar in shape; the threaded female hose swivel connector body swivel engaging surface 218 would be concave in shape. In another design, the hose connecting member body swivel flange seating surface 228 can be convex in shape; the threaded female hose swivel connector body swivel engaging surface 218 would be concave in shape, each of the hose connecting member body swivel flange seating surface 228 and the threaded female hose swivel connector body swivel engaging surface 218 having the same or every similar radii of curvature. An outer diameter of the hose connecting member body swivel flange 227 would be equal to or less than a diameter of the interior surface of the threaded female hose swivel connector body 210, enabling the hose connecting member body swivel flange 227 to be inserted through an end of the threaded female hose swivel connector body 210 opposite an end comprising the threaded female hose swivel connector body swivel engaging flange 216.

A hose connecting member body sealing flange guide surface 226 is formed along an end of the hose connecting member body 222 proximate the hose connecting member body swivel flange 227. The hose connecting member body sealing flange guide surface 226 can be formed having a diameter that is larger than the diameter of the remaining portions of the hose connecting member body 222. The diameter of the hose connecting member body sealing flange guide surface 226 is preferably substantially of a same diameter as a diameter of an aperture extending through the threaded female hose swivel connector body swivel engaging flange 216. The hose connecting member body sealing flange guide surface 226 aids in centering the hose connecting member 220 within the threaded female hose swivel connector body 210.

The female hose swivel connector 200 is assembled by inserting the hose connecting member body 222 into the interior of the threaded female hose swivel connector body 210 and continuing through the aperture formed through the threaded female hose swivel connector body swivel engaging flange 216, until the hose connecting member body swivel flange seating surface 228 rests against the threaded female hose swivel connector body swivel engaging surface 218. An annular pliant swivel washer 230 is inserted into the interior of the threaded female hose swivel connector body 210 and seated against a hose connecting member body sealing surface 225 of the hose connecting member body swivel flange 227. An exterior diameter of the annular pliant swivel washer 230 is preferably slightly larger than the interior diameter of the threaded female hose swivel connector body 210, thus creating an interference fit. The pliancy of the annular pliant swivel washer 230 enables ease of installation. The interference fit retains the annular pliant swivel washer 230 within the interior of the threaded female hose swivel connector body 210.

An optional male to male threaded adapter 240 can be utilized to adapt the threaded female hose swivel connector body threaded interior surface 213 to connect to a mating female receptacle, such as the motor flush inlet connection 312a, 312b, 312c (FIG. 5). The combination of the female hose swivel connector 200 and the male to male threaded adapter 240 enables rotation of the threaded female hose swivel connector body 210 during connectivity between the threaded female hose swivel connector body 210 and a mating male connector, without translating the rotational motion to the connected hose. The male to male threaded adapter 240 is fabricated having a male to male adapter interior surface 249 defining a bore passing therethrough. It is preferred that a diameter of the hose connecting member body interior surface 229 and a diameter of the male to male adapter interior surface 249 are substantially the same, providing optimal flow of fluid passing therethrough. The male to male threaded adapter 240 includes a male to male adapter first threaded segment 244 formed at a first end and a male to male adapter second threaded segment 246 formed at a second, opposite end.

In one assembly process, an annular pliant end washer 232 is inserted into a threaded female receptacle, such as any of the motor flush inlet connections 312a, 312b, 312c. The male to male adapter second threaded segment 246 is inserted into and threadably assembled to the threaded female receptacle. In the exemplary illustration shown in FIG. 5, a second flush water delivery hose male to male adapter second threaded segment 246b is assembled within the center outboard motor flush inlet connection 312b. The rotational assembly continues until a male to male threaded adapter second edge 245 of the male to male adapter second threaded segment 246 is properly seated against a mating surface of the annular pliant end washer 232. Once the male to male threaded adapter second edge 245 of the male to male adapter second threaded segment 246 is properly seated against the mating surface of the annular pliant end washer 232, the threaded female hose swivel connector body threaded interior surface 213 is threadably assembled to the male to male adapter first threaded segment 244. The rotational assembly continues until a male to male threaded adapter first edge 243 of the male to male adapter first threaded segment 244 is properly seated against a mating surface of the annular pliant swivel washer 230. The swivel capability of the female hose swivel connector 200 enables rotation of the threaded female hose swivel connector body 210 while maintaining a constant orientation of the connected hose.

In a second assembly process, the threaded female hose swivel connector body threaded interior surface 213 is threadably assembled to the male to male adapter first threaded segment 244. The rotational assembly continues until a male to male threaded adapter first edge 243 of the male to male adapter first threaded segment 244 is properly seated against a mating surface of the annular pliant swivel washer 230. The annular pliant end washer 232 is inserted into the threaded female receptacle, such as any of the motor flush inlet connections 312*a*, 312*b*, 312*c*. The male to male adapter second threaded segment 246 is then inserted into and threadably assembled to the threaded female receptacle. The rotational assembly continues until a male to male threaded adapter second edge 245 of the male to male adapter second threaded segment 246 is properly seated against a mating surface of the annular pliant end washer 232. The swivel capability of the female hose swivel connector 200 enables rotation of the male to male threaded adapter 240 while maintaining a constant orientation of the connected hose.

Effectively, the female hose swivel connector 200 in combination with the male to male threaded adapter 240 provides the same functionality as the flush water swivel adaptor hose assembly 140*a*, 140*b*, 140*c*, 140*d*, while improving the overall function by eliminating a joint along a length of the fluid delivery system, where the joint can scratch or cause other damage to the boat or any other article in the area.

The threaded female hose swivel connector body 210 is fabricated of any suitable material, such as plastic, brass, aluminum, stainless steel, cast metal, and the like. The threaded female hose swivel connector body 210 can be manufactured using a molding process, a machining process, a casting process, or by any other suitable process. The hose connecting member 220 is fabricated of any suitable material, such as plastic, brass, aluminum, stainless steel, cast metal, and the like. The hose connecting member 220 can be manufactured using a molding process, a machining process, a casting process, or by any other suitable process. The male to male threaded adapter 240 is fabricated of any suitable material, such as plastic, brass, aluminum, stainless steel, cast metal, and the like. The male to male threaded adapter 240 can be manufactured using a molding process, a machining process, a casting process, or by any other suitable process. The annular pliant swivel washer 230 and the annular pliant end washer 232 are fabricated of any suitable, pliant and/or compressible material, such as rubber, nylon, plastic, foam, cork, and the like.

Figure 4:
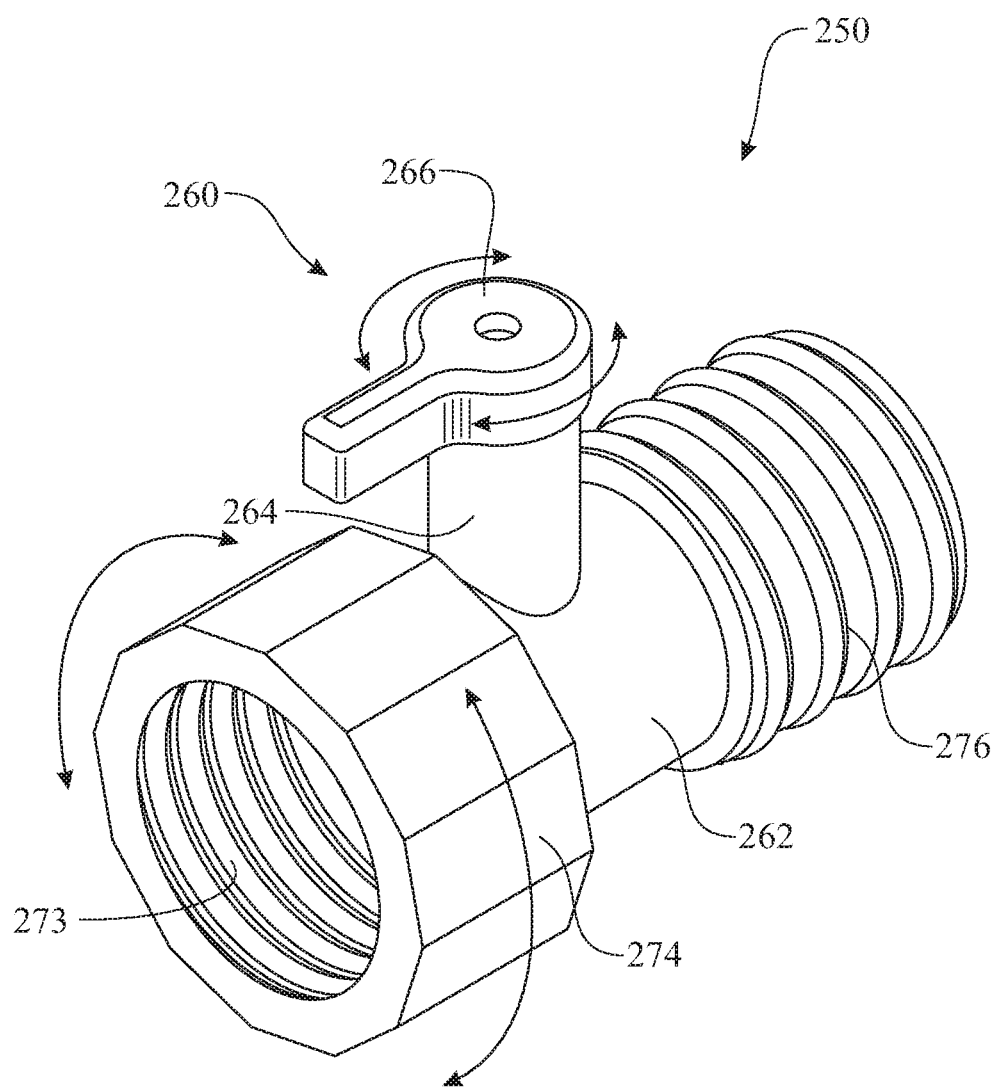
FIG. 4 presents an isometric top, side view of an exemplary engine flush intake adaptor assembly.

In an alternative arrangement, a boat owner can install an engine flush intake adaptor assembly 250, as detailed in FIGS. 4 and 5, into each motor flush inlet connection 312*a*, 312*b*, 312*c*. The engine flush intake adaptor assembly 250 includes an engine flush intake adaptor valve subassembly 260 comprising an engine flush intake adaptor valve body 262, an engine flush intake adaptor male thread connection 276 provided as a delivery end of the engine flush intake adaptor valve body 262 and an engine flush intake adaptor female thread swivel connection 274 provided at a supply end of the engine flush intake adaptor valve body 262. The engine flush intake adaptor female thread swivel connection 274 includes an engine flush intake adaptor female thread 273 formed on an interior surface thereof. A valve assembly 260 is integral within the engine flush intake adaptor valve body 262. The valve assembly 260 can utilize any suitable valve arrangement, including a globe valve, a gate valve, a ball valve, a lever controlled valve, or any other suitable valve. The engine flush intake adaptor valve subassembly 260 would be manually operated by engine flush intake adaptor valve control handle 266. The engine flush intake adaptor valve control handle 266 can be a rotating control handle, as illustrated, a pivoting lever, or any other suitable control member. The operating mechanisms of the engine flush intake adaptor valve subassembly 260 can be supported by an engine flush intake adaptor valve control tube 264. The engine flush intake adaptor valve control tube 264 can be integral with the engine flush intake adaptor valve body 262. It is preferred that the engine flush intake adaptor valve body 262, the engine flush intake adaptor valve control tube 264, and the engine flush intake adaptor male thread connection 276 be fabricated having a unitary construction, such as by a casting, a machining process, a molding process, and the like. Due to the installation of the engine flush intake adaptor assembly 250 into a marine motor 310*a*, 310*b*, 310*c*, it is optimal that the material selected for manufacturing the engine flush intake adaptor assembly 250 be non-corrosive, such as aluminum, brass, plastic, and the like. The material is also considered to be compatible with the material of the motor flush inlet connection 312*a*, 312*b*, 312*c*, where material interactions can accelerate or hinder corrosion at the interface therebetween.

The boat owner, the motor manufacturer, a service technician, or any other reasonable party can install an engine flush intake adaptor assembly 250 into each motor flush inlet connection 312*a*, 312*b*, 312*c* of each respective marine motor 310*a*, 310*b*, 310*c*. During storage, the engine flush intake adaptor valve subassembly 260 would be placed into a closed orientation, ensuring fluid, debris, or any other foreign matter does not enter the motor flush inlet connection 312*a*, 312*b*, 312*c*. During a flush cycle, the operator would connect the flush water supply system to each engine flush intake adaptor female thread swivel connection 274 of each respective engine flush intake adaptor assembly 250. The swivel functionality of the engine flush intake adaptor female thread swivel connection 274 enables connectivity without rotating the supply hose of the flush water supply system. The flush water supply system can be a single flush water supply hose (such as the flush water delivery hose assembly 130*a*, 130*b*, 130*c*, 130*d*) or the bifurcating marine engine fresh water flush system 100 as described herein.

Details of several exemplary variants of implementations of the bifurcating marine engine fresh water flush system 100 are illustrated in FIG. 5. The exemplary illustration includes three (3) marine motors 310*a*, 310*b*, 310*c* rigged in a marine vessel 300. The exemplary bifurcating marine engine fresh water flush system 100 includes four (4) supply branches. The bifurcating marine engine fresh water flush system 100 can be installed by connecting each delivery end of each flush water delivery hose 132 directly to each motor flush inlet connection 312a, 312b, 312c of each respective marine motor 310a, 310b, 310c. Although this is feasible, when the motor flush inlet connection 312a, 312b, 312c is a fixed female connection configuration, the rotation required to couple the threaded connection would cause rotation and possible kinking of the flush water delivery hose 132. The bifurcating marine engine fresh water flush system 100 can be installed by connecting each delivery end of each optional flush water swivel adaptor hose 142 to each motor flush inlet connection 312a, 312b, 312c of each respective marine motor 310a, 310b, 310c (as shown being connected to marine motors 310b, 310c). The flush water swivel adaptor hose female thread swivel connection 144 assembled at the supply end of the flush water swivel adaptor hose 142 enables rotation of the flush water swivel adaptor hose 142 respective to the flush water delivery hose 132, thus eliminating twisting and potential kinking of the flush water delivery hose 132. In another variant, the engine flush intake adaptor assembly 250 can be installed into the each motor flush inlet connection 312a, 312b, 312c of each respective marine motor 310a, 310b, 310c (as shown being connected to marine motor 310a). In this arrangement, the engine flush intake adaptor female thread swivel connection 274 provides the rotation required to couple the threaded connection between the engine flush intake adaptor assembly 250 and the flush water delivery hose assembly 130a, 130b, 130c, 130d, thus eliminating twisting and potential kinking of the flush water delivery hose 132. When using the engine flush intake adaptor assembly 250, control of flow of the flush water from the flush water source 190, can be provided by either the engine flush intake adaptor valve subassembly 260 or the respective manifold branch flow control valve (open) 125a (closed) 125d of the flush water manifold assembly (wye) 120.

Figure 6:
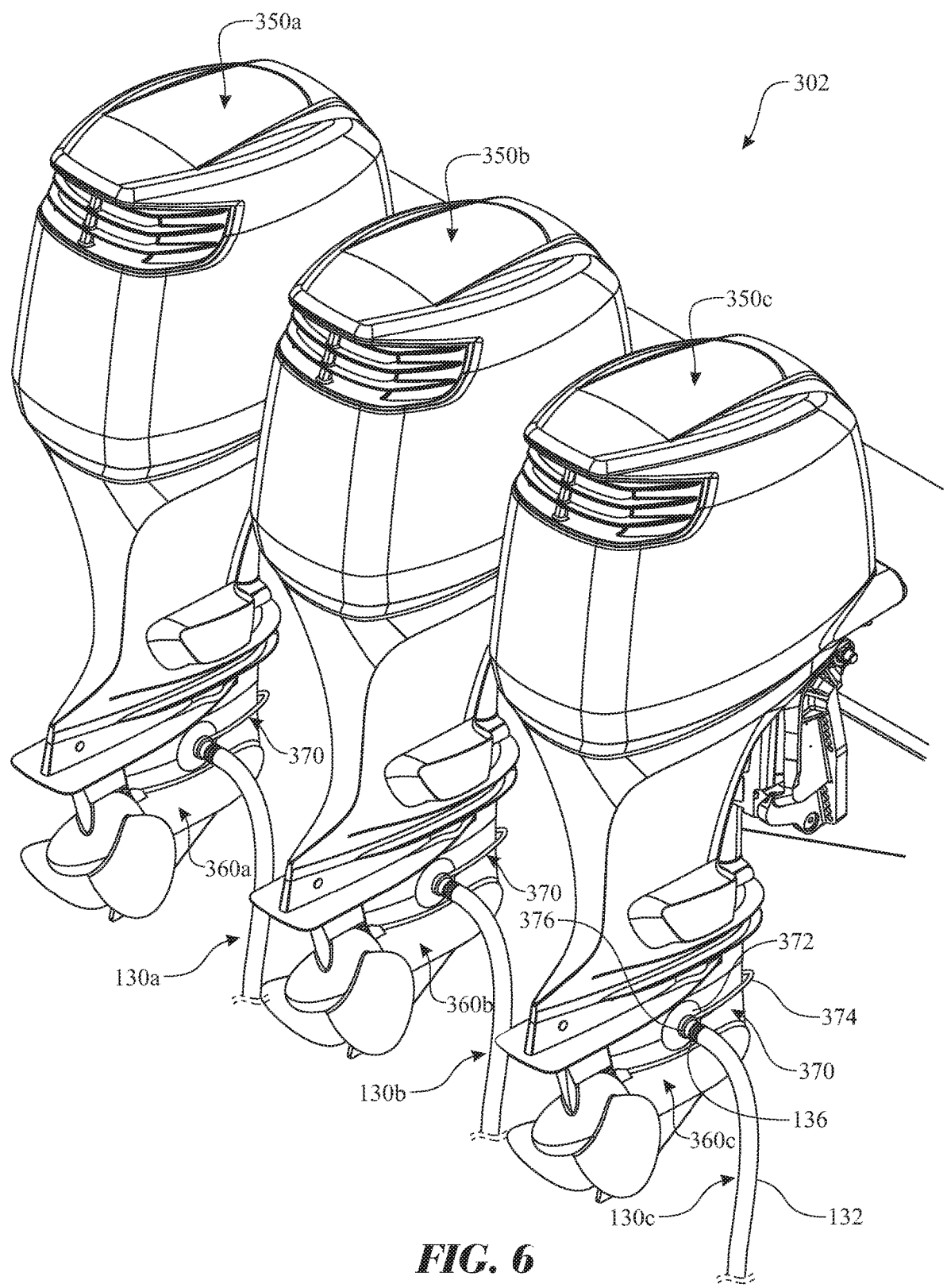
FIG. 6 presents an isometric rear, top view of a twin-powered marine vessel employing the exemplary bifurcating marine engine fresh water flush system introduced in FIG. 1 in conjunction with an exemplary marine engine flusher.

A second exemplary installation of the bifurcating marine engine fresh water flush system 100 is illustrated in FIG. 6. A multi-powered water vessel 302 is rigged including a port outboard motor 350a, a center outboard motor 350b, and a starboard outboard motor 350c. Each of the marine motors 350a, 350b, 350c are configured to be flushed through intake ports 316 (covered by a marine engine flusher cup 372 of each marine engine flusher 370) provided through the respective lower unit 360a, 360b, 360c.

The marine engine flusher 370 is fabricated having a pair of marine engine flusher cups 372. Each marine engine flusher cup 372 is fabricated of a pliant material, such as rubber, nylon, flexible plastic, and the like, enabling the marine engine flusher cups 372 to conform to each contacting section of the sidewall of the outboard motor lower unit 360a, 360b, 360c. Each marine engine flusher cup 372 is assembled to a free end of a marine engine flusher mounting frame 374. The marine engine flusher mounting frame 374 is fabricated of a rigid material having elastic (spring like) properties, enabling separation of the marine engine flusher cups 372 for positioning over the series of outboard motor lower unit cooling water intake ports 316 and maintaining sufficient contact between marine engine flusher cups 372 and the sidewall of the outboard motor lower unit 360a, 360b, 360c. The marine engine flusher mounting frame 374 would be shaped to extend sufficiently forward or rearward around the leading edge of the trailing edge of the outboard motor lower unit 314. The rigid material having elastic (spring like) properties used for fabricating the marine engine flusher mounting frame 374 can be steel, aluminum, rigid plastic, a composite material, or any other suitable material or combination of materials. The exemplary marine engine flusher mounting frame 374 includes a loop formed at each free end. On one side, the delivery tube of the marine engine flusher cup 372 is inserted through the loop formed in the free end of the marine engine flusher mounting frame 374. A marine engine flusher swivel female threaded connection 376 is assembled to the end of the delivery tube. On the other side, the marine engine flusher cup 372 is assembled to the marine engine flusher mounting frame 374 by inserting a retention member (not shown) through the second loop formed on the second free end of the marine engine flusher mounting frame 374.

In the second exemplary installation of the bifurcating marine engine fresh water flush system 100, a marine engine flusher swivel female threaded connection 376 of each marine engine flusher 370 is connected to a delivery end of each respective flush water delivery hose assembly 130a, 130b, 130c (it is noted that in the exemplary illustration, the flush water delivery hose assembly 130d is not connected). The flush water delivery hose male thread connection 136 of the respective flush water delivery hose assembly 130a, 130b, 130c is threadably connected to the marine engine flusher swivel female threaded connection 376 of the respective marine engine flusher 370. Although the exemplary connection or union is a male-female threaded connection, the connection or union can be of any suitable disconnectable connection form factor, such as those previously described herein.

Each exemplary marine motor 310a, 310b, 310c includes an outboard motor flush inlet connection 312a, 312b, 312c and a series of outboard motor lower unit cooling water intake ports 316 integral in the outboard motor lower unit 314. This configuration enables flushing of each marine motor 310a, 310b, 310c using either flush process.

The following describes exemplary modes of flushing a marine engine 310a, 310b, 310c using the bifurcating marine engine fresh water flush system 100.

The user or operator would install the bifurcating marine engine fresh water flush system 100 by connecting a flush water source 190 to either the flush water supply arrangement 110 to directly to the inlet port of the flush water manifold assembly (wye) 120. A delivery end of one flush water delivery hose assembly 130a, 130b, 130c, 130d is connected to a respective motor flush inlet connection 312a, 312b, 312c of the marine motor 310a, 310b, 310c. In the exemplary illustration shown in FIG. 5, the first flush water delivery hose assembly 130a is connected to an engine flush intake adaptor assembly 250, where the engine flush intake adaptor assembly 250 is installed into the port outboard motor flush inlet connection 312a of the port outboard motor 310a. During the process of connecting the flush water delivery hose male thread connection 136a to the port outboard motor flush inlet connection 312a, the rotation of the engine flush intake adaptor female thread swivel connection 274 prevents any transfer of the rotational motion to the flush water delivery hose 132. Although the exemplary illustration presents this configuration for the port outboard motor 310a, it is understood that this installation configuration can be utilized in any or all of the connections to the remaining marine motors 310b, 301c.

The above describes a first exemplary connection configuration. The exemplary illustration also presents a second exemplary connection configuration, In the exemplary illustration shown in FIG. 5, the second flush water delivery hose assembly 130b is connected to a female hose swivel connector 200 in combination with a male to male threaded adapter 240. The exemplary illustration demonstrates the second exemplary connection configuration where the female hose swivel connector 200 in combination with the male to male threaded adapter 240 is installed into the centered outboard motor flush inlet connection 312*b* of the center outboard motor 310*b*. The female hose swivel connector 200 provides a swivel interface between the second flush water delivery hose assembly 130*b* and a respective fixed connector. The male to male threaded adapter 240 enables the threaded female hose swivel connector body 210 of the female hose swivel connector 200 to threadably connect with the center outboard motor flush inlet connection 312*b*, while the second flush water delivery hose, hose connecting member body 222*b* remains stationary. During the process of connecting the female hose swivel connector 200 to the center outboard motor flush inlet connection 312*b*, the rotation of the threaded female hose swivel connector body 210 prevents any transfer of the rotational motion to the second flush water delivery hose assembly 130*b*. Although the exemplary illustration presents this configuration for the center outboard motor 310*b*, it is understood that this installation configuration can be utilized in any or all of the connections to the remaining marine motors 310*a*, 301*c*.

The above describes a first exemplary connection configuration and a second exemplary connection configuration. The exemplary illustration shown in FIG. 5 also presents a third exemplary connection configuration, During the process of connecting the third flush water swivel adaptor hose male thread connection 146*c* to the starboard outboard motor flush inlet connection 312*c*, the flush water swivel adaptor hose female thread swivel connection 144 enables rotation of the second flush water swivel adaptor hose assembly 140*c*, while avoiding any transfer of rotation to the flush water delivery hose 132.

The exemplary illustration also presents a scenario where the number of branches of the bifurcating marine engine fresh water flush system 100 is greater than the number of marine motors 310*a*, 310*b*, 310*c*. In the exemplary illustration, the fourth flush water delivery hose assembly 130*d* is not connected to a marine motor 310*a*, 310*b*, 310*c*. The fourth flush water delivery hose assembly 130*d* is an excess delivery branch respective to the rigging of the multi-powered water vessel 300.

Once installed, the user or operator would proceed in configuring the installed bifurcating marine engine fresh water flush system 100 for use. The user or operator would actuate each manifold branch flow control valve 125*a*, 125*d* into an appropriate orientation based upon the connectivity of each associated flush water delivery hose assembly 130*a*, 130*b*, 130*c*, 130*d* to a respective marine motor 310*a*, 310*b*, 310*c*. The user or operator can additionally take into consideration the volumetric flow rate of flush water from the flush water supply source 190, the number of utilized branches 123*a*, 123*b*, 123*c*, 123*d* of the system, and the volumetric flow rate required by the flush system of the marine motor 310*a*, 310*b*, 310*c*. When the total volumetric flow rate required by the flush system of the marine motors 310*a*, 310*b*, 310*c* is greater than a calculated maximum volumetric flow rate through the number of utilized branches 123*a*, 123*b*, 123*c*, 123*d* of the system, the operator would exclude or turn off flow from a required number of utilized branches 123*a*, 123*b*, 123*c*, 123*d* of the system to increase the remaining number of utilized branches 123*a*, 123*b*, 123*c*, 123*d* of the system to the marine motors 310*a*, 310*b*, 310*c*.

It is recognized that the bifurcating marine engine fresh water flush system 100 provides an advantage of a single element (the flush water manifold assembly (wye) 120) for managing the flow of flush water to each marine motor 310*a*, 310*b*, 310*c*. By integrating the valves into the flush water manifold assembly (wye) 120, the operator only has to manage the orientation of the valves 125*a*, 125*d* at a single location, and where all orientations are easy to reference respective to the other valves 125*a*, 125*d*.

In a first example, referring to the multi-powered water vessel 300 illustrated in FIG. 5, the total volumetric flow rate required by the flush system of the marine motors 310*a*, 310*b*, 310*c* would be less than or equal to the volumetric flow rate provided by the flush water supply 190. In this example, the three of the manifold branch flow control valves are placed in an open orientation 125*a*. The remaining branch (identified by 130*d*) is disconnected and the respective manifold branch flow control valve is placed in a closed orientation 125*d*. The operator would enable flow of flush water from the flush water supply source 190, such as by turning on a spigot. The operator would proceed with the process of flushing all marine motors 310*a*, 310*b*, 310*c* simultaneously. This flush process is commonly utilized where the marine motors 310*a*, 310*b*, 310*c* are configured to be flushed without running the motors. This flush process is normally associated with the arrangement illustrated in FIG. 5. In this configuration, the total volumetric flow rate required by the flush system of the marine motors 310*a*, 310*b*, 310*c* is nominal, simply requiring the flow of flush water through the cooling system. The flush process can be accomplished by running the flush water through the engine over a period of time.

In another example, referring to the twin powered water vessel 302 illustrated in FIG. 6, the flush process occurs while the marine motors 310*a*, 310*b*, 310*c* are fired up and running. This flush process normally requires a higher volumetric flow rate compared to the flow rate required by a passive flush process described above. The respective flush process would be based upon the manufacturer's recommendations and the configuration of the marine motor 310*a*, 310*b*, 310*c*.

In more detail, the total volumetric flow rate required by the flush system of three (3) or more marine motors 360*a*, 360*b*, 360*c* is normally greater than the volumetric flow rate provided by the flush water supply 190. In this example, the operator would calculate the maximum number of branches that can be used to supply the total volumetric flow rate required by the flush system of the marine motors 360*a*, 360*b*, 360*c*. In most instances, when the flush water is supplied via city or county water through a spigot at a home, a small business, a boatyard, and the like, the volumetric flow rate provided by the flush water supply 190 is sufficient to flush two (2) of the marine motors 360*a*, 360*b*, 360*c*. In this example, the operator would place one of the manifold branch flow control valves that are in line with one of the flush water delivery hose assemblies 130*a*, 130*b*, 130*c* into a closed orientation 125*d*. The operator would proceed with the process of simultaneously flushing the marine motors 360*a*, 360*b*, 360*c* that are connected to the delivery hose assemblies that are receiving the flush water. Upon completion, the operator would toggle the manifold branch flow control valves from an open orientation to a closed orientation and toggle up to maximum number of branches that can be used to supply the total volumetric flow rate required by the flush system of the marine motors 360*a*, 360*b*, 360*c* connected to the remaining un-flushed marine motors requiring flushing from a closed orientation to an open orientation. The process is repeated until all marine motors 360*a*, 360*b*, 360*c* are flushed. The employment of the flush water manifold assembly 120 provides an advantage where the operator can manage the toggling of the manifold branch flow control valves (shown in an open orientation 125a and a closed orientation 125d in FIG. 5). The operator can systematically toggle and manage the manifold branch flow control valves 125a, 125d, as the manifold branch flow control valves 125a, 125d presents the manifold branch flow control valves 125a, 125d in a specific arrangement where the operator can determine the orientation of each the manifold branch flow control valve 125a, 125d respective to the orientation of the other manifold branch flow control valves 125a, 125, as the controllers for the manifold branch flow control valves 125a, 125 are all located adjacent to one another.

The bifurcating marine engine fresh water flush system 100 provides an advantage, should it be needed, where the operator can connect the flush water delivery hose male thread connection 136a directly to the port outboard motor flush inlet connection 312a, preferably while the flush water delivery hose female thread swivel connection 134 is disconnected from the manifold male thread connection 126. While joining the flush water delivery hose male thread connection 136a and the engine flush intake adaptor female thread swivel connection 274, the first flush water delivery hose assembly 130a is free to rotate. Upon completion of coupling the flush water delivery hose male thread connection 136a and the engine flush intake adaptor female thread swivel connection 274, the operator can then use the swivel function of the flush water delivery hose female thread swivel connection 134 to couple the flush water delivery hose female thread swivel connection 134 and the manifold male thread connection 126 to one another, while avoiding conveyance of the rotational motion to the flush water manifold assembly (wye) 120.

In the exemplary illustration, the motor flush inlet connection 312a, 312b, 312c are located at a rear of the marine motor 310a, 310b, 310c. The motor flush inlet connection 312a, 312b, 312c can be located in any location designated by the motor designer and manufacturer. For example, the motor flush inlet connection 312a, 312b, 312c can be located in a front region of the marine motor 310a, 310b, 310c. The hoses 132, 142 would be sufficiently flexible to accommodate any location of the motor flush inlet connection 312a, 312b, 312c.

Figure 7:
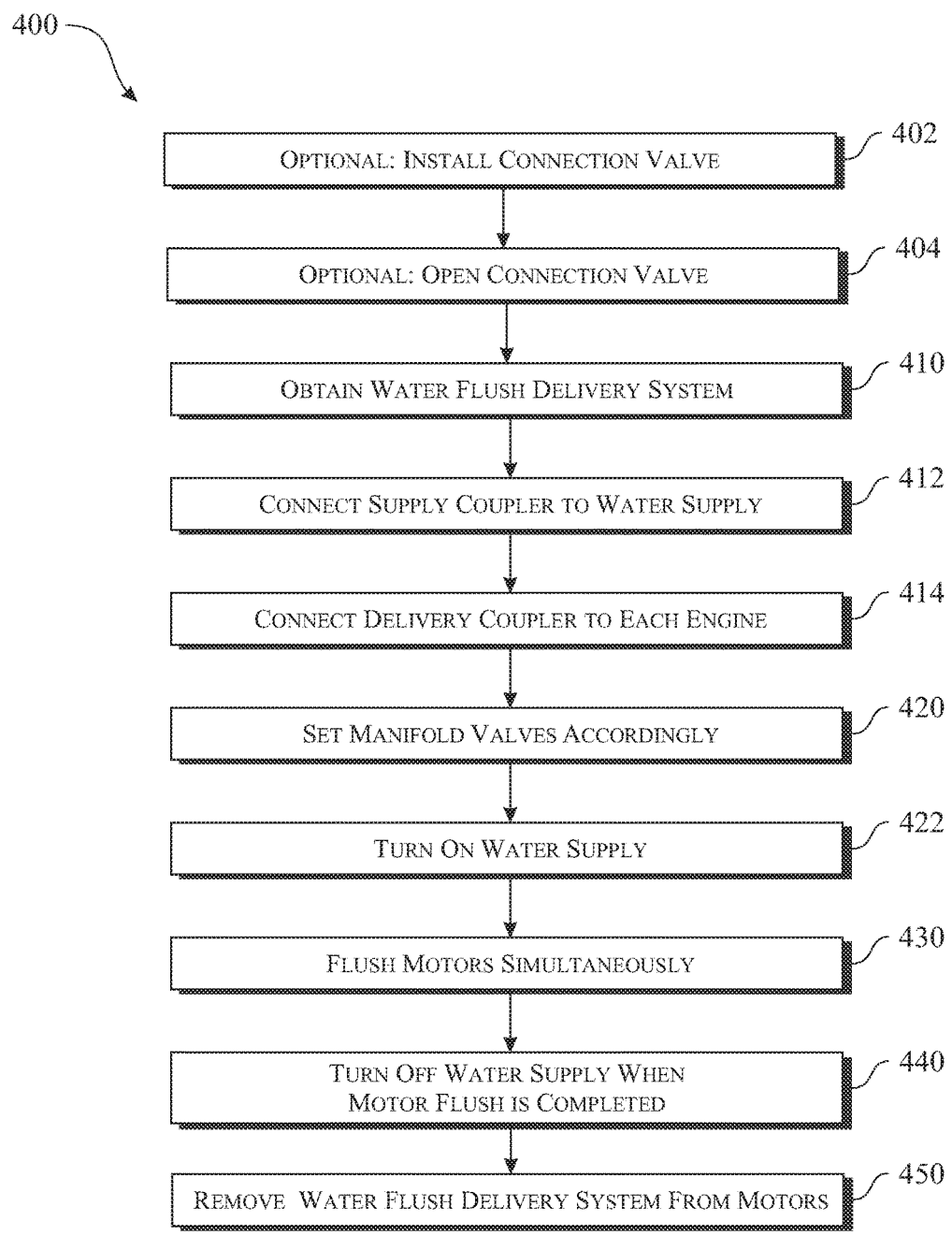
FIG. 7 presents an exemplary flow diagram describing steps of utilizing the exemplary bifurcating marine engine fresh water flush system introduced in FIG. 1 and the exemplary engine flush intake adaptor assembly introduced in FIG. 4.

A process of utilizing the bifurcating marine engine fresh water flush system 100 is outlined in a bifurcating marine engine fresh water flush operating flow diagram 400, presented in FIG. 7. The bifurcating marine engine fresh water flush operating flow diagram 400 initiates with an optional step of installing an engine flush intake adaptor assembly 250 into each motor flush inlet connection 312a, 312b, 312c of each marine motor 310a, 310b, 310c (step 402). In the exemplary illustration, the engine flush intake adaptor male thread connection 276 is threadably assembled to the mating female threads of the motor flush inlet connection 312a, 312b, 312c. The engine flush intake adaptor assembly 250 would remain installed in each motor flush inlet connection 312a, 312b, 312c of each marine motor 310a, 310b, 310c and would normally have the engine flush intake adaptor valve subassembly 260

When the engine flush intake adaptor assembly 250 into each motor flush inlet connection 312a, 312b, 312c of each marine motor 310a, 310b, 310c, the operator would open the engine flush intake adaptor valve subassembly 260 (step 404). In a configuration where the flush water is provided directly from the spigot or other flush water source, the engine flush intake adaptor valve subassembly 260 can be used to control flow of the flush water prior to, during, and subsequent to the flush process. In a configuration where a second flow control valve is integrated between the spigot and the engine flush intake adaptor assembly 250, the engine flush intake adaptor valve subassembly 260 can be simply left in an open orientation until removal of the first flush water delivery hose assembly 130a or other flush water delivery hose.

The operator would obtain a bifurcating marine engine fresh water flush system 100 (step 410), where the bifurcating marine engine fresh water flush system 100 can be a standard prefabricated assembly, as illustrated in FIG. 5, or optionally be customized for the specific rigging of the multi-powered water vessel 300 (in the instant exemplary multi-powered water vessel 300, the bifurcating marine engine fresh water flush system 100 would include three (3) flush water delivery branches). The operator would connect the supply connection of the flush water supply arrangement 110 to a water flush supply 190, which is commonly a spigot located near the multi-powered water vessel 300 (step 412). The flush water supply arrangement 110 can be included with the bifurcating marine engine fresh water flush system 100 or provided by the operator. When the flush water supply arrangement 110 is included with the bifurcating marine engine fresh water flush system 100, a supply end of the flush water supply arrangement 110 can be directly attached to either a spigot or other flush water supply 190, or the supply end of the flush water supply arrangement 110 can be attached to a garden hose (or similar), which is connected to a spigot or other flush water supply 190.

Each delivery end of the bifurcating marine engine fresh water flush system 100 (the free end (the flush water delivery hose male connection hose attachment 137) of each of the flush water delivery hose assembly 130a, 130b, 130c, 130d or the free end (the flush water swivel adaptor hose male connection hose attachment 147) of each of the flush water swivel adaptor hose assembly 140a, 140b, 140c, 140d) is attached to ether the motor flush inlet connection 312a, 312b, 312c of each respective marine motor 310a, 310b, 310c or an engine flush intake adaptor female thread swivel connection 274 of an engine flush intake adaptor assembly 250 installed into the motor flush inlet connection 312a, 312b, 312c of each respective marine motor 310a, 310b, 310c (step 414). In a first preferred arrangement, each flush water swivel adaptor hose male connection hose attachment 147 located at the free end of the respective flush water swivel adaptor hose assembly 140a, 140b, 140c, 140d is threadably coupled to the motor flush inlet connection 312a, 312b, 312c of each respective marine motor 310a, 310b, 310c (step 414). In a second preferred arrangement, each flush water delivery hose male connection hose attachment 137 located at the free end of the respective flush water delivery hose assembly 130a, 130b, 130c, 130d is threadably coupled to the engine flush intake adaptor assembly 250 installed into the motor flush inlet connection 312a, 312b, 312c of each respective marine motor 310a, 310b, 310c (step 414). As illustrated, the bifurcating marine engine fresh water flush system 100 may include a number of flush water supply branches that is greater than the number of marine motors 310a, 310b, 310c. In this case, the unconnected branch is identified and the operator would retain the manifold branch flow control valve in a closed 125d orientation.

The operator would determine which of the manifold branch flow control valve to place into an open orientation 125a (step 420) based upon the connectivity of the flush water supply lines 130a, 130b, 130c, (130d remains disconnected) to each respective marine motor 310a, 310b, 310c or a minimum required volumetric flush water flow requirements for each engine and the total volumetric flush water flow provided by the flush water source 190. Details are provided above.

Once the bifurcating marine engine fresh water flush system 100 is properly installed and configured, the flush water supply would be activated (turned on) (step 422), enabling flow of flush water through the flush water manifold assembly (wye) 120, continuing through each connected supply line flush water delivery hose assembly 130a, 130b, 130c associated with an opened manifold branch flow control valve 125a. The flush water is delivered from each respective delivery branch, as illustrated in FIG. 1, as a flush water delivery, first branch 192a, a flush water delivery, second branch 192b, and a flush water delivery, third branch 192c. It is noted that the flush water is blocked in the fourth manifold distribution branch 123d by the manifold branch flow control valve (closed) 125d, where the blocked flow is identified as a flush water delivery (blocked), fourth branch 192d.

Each marine motor 310a, 310b, 310c receiving flush water is simultaneously flushed according to the manufacturer's instructions (step 430). The arrangement of the bifurcating marine engine fresh water flush system 100 enables simultaneous completion of a flush process for two or more of the marine motors 310a, 310b, 310c. The process is repeated with any additional marine motors 310a, 310b, 310c that did not receive flush water during the previous flush processes. The manifold branch flow control valves would be toggled between open 125a and closed 125d according to need of providing the flush water to the marine motors 310a, 310b, 310c until all marine motors 310a, 310b, 310c have been adequately flushed.

Once the flush process for each marine motor 310a, 310b, 310c has been completed, the operator begins a process of uninstalling the bifurcating marine engine fresh water flush system 100 by removing the bifurcating marine engine fresh water flush system 100 from the multi-powered water vessel 300 (step 450). The flush water supply source is deactivated (i.e. turned off) (step 440). Each connection between the bifurcating marine engine fresh water flush system 100 and each marine motor 310a, 310b, 310c is disconnected. The connection between the bifurcating marine engine fresh water flush system 100 and the flush water supply 190 is disconnected. In a configuration where the engine flush intake adaptor assembly 250 has been installed in the marine motors 310a, 310b, 310c, each engine flush intake adaptor valve subassembly 260 is placed into a closed orientation. The bifurcating marine engine fresh water flush system 100 is removed from installation and stored for future use (step 450).

The bifurcating marine engine fresh water flush system 100 provides a number of advantages. Several have been described above. The bifurcating marine engine fresh water flush system 100 enables quick customization by having various configurations of flush water manifold assemblies 120 available (each having a different number of distribution branches), then determining the number of desired distribution branches for the application, selecting the respective flush water manifold assembly 120 configuration and assembling the respective number of flush water delivery hose assemblies 130a, 130b, 130c, 130d. The detachable arrangement between the flush water manifold assembly 120 and each flush water delivery hose assembly 130a, 130b, 130c, 130d enable replacement of any of the flush water delivery hose assemblies 130a, 130b, 130c, 130d for any suitable reason, including change in length, damage, change in connection type at the delivery end thereof, and the like.

Although the exemplary illustrations present applications on outboard motors, it is understood that the bifurcating marine engine fresh water flush system 100 can be utilized when flushing other power configurations, such as inboard/outboard motors having open cooling systems.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

REFERENCE ELEMENT LIST

Ref No. Description 100 bifurcating marine engine fresh water flush system
110 flush water supply arrangement
112 flush water supply hose
116 flush water supply hose male thread connection
117 flush water supply hose male connection hose attachment
120 flush water manifold assembly
121 supply conduit
122 manifold body
123a first manifold distribution branch
123b second manifold distribution branch
123c third manifold distribution branch
123d fourth manifold distribution branch
124 manifold female thread swivel connection
125a manifold branch flow control valve (open)
125d manifold branch flow control valve (closed)
126 manifold male thread connection
130a first flush water delivery hose assembly
130b second flush water delivery hose assembly
130c third flush water delivery hose assembly
130d fourth flush water delivery hose assembly
132 flush water delivery hose
134 flush water delivery hose female thread swivel connection
135 flush water delivery hose female swivel connection hose attachment
136 flush water delivery hose male thread connection
136a flush water delivery hose male thread connection
137 flush water delivery hose male connection hose attachment
140a first flush water swivel adaptor hose assembly
140b second flush water swivel adaptor hose assembly
140c third flush water swivel adaptor hose assembly
140d fourth flush water swivel adaptor hose assembly
142 flush water swivel adaptor hose
144 flush water swivel adaptor hose female thread swivel connection
145 flush water swivel adaptor hose female swivel connection hose attachment
146 flush water swivel adaptor hose male thread connection
146b second flush water swivel adaptor hose male thread connection
146c third flush water swivel adaptor hose male thread connection
147 flush water swivel adaptor hose male connection hose attachment
150 manifold distribution branch identifier
152 flush water delivery hose assembly identifier
153 flush water swivel adaptor hose assembly identifier
190 flush water supply 192a flush water delivery, first branch
192b flush water delivery, second branch
192c flush water delivery, third branch
192d flush water delivery (blocked), fourth branch
200 female hose swivel connector
210 threaded female hose swivel connector body
212 threaded female hose swivel connector body exterior surface
218 threaded female hose swivel connector body swivel engaging surface
213 threaded female hose swivel connector body threaded interior surface
216 threaded female hose swivel connector body swivel engaging flange
220 hose connecting member
222 hose connecting member body
222b second flush water delivery hose, hose connecting member body
225 hose connecting member body sealing surface
226 hose connecting member body sealing flange guide surface
227 hose connecting member body swivel flange
228 hose connecting member body swivel flange seating surface
229 hose connecting member body interior surface
230 annular pliant swivel washer
232 annular pliant end washer
240 male to male threaded adapter
242 male to male threaded adapter exterior surface
243 male to male threaded adapter first edge
244 male to male adapter first threaded segment
245 male to male threaded adapter second edge
246 male to male adapter second threaded segment
246b second flush water delivery hose male to male adapter second threaded segment
249 male to male adapter interior surface
250 engine flush intake adaptor assembly (wye)
260 engine flush intake adaptor valve subassembly
262 engine flush intake adaptor valve body
264 engine flush intake adaptor valve control tube
266 engine flush intake adaptor valve control handle
273 engine flush intake adaptor female thread
274 engine flush intake adaptor female thread swivel connection
276 engine flush intake adaptor male thread connection
300 multi-powered water vessel
302 multi-powered water vessel
310a port outboard motor
310b center outboard motor
310c starboard outboard motor
312a port outboard motor flush inlet connection
312b center outboard motor flush inlet connection
312c starboard outboard motor flush inlet connection
314 outboard motor lower unit
316 outboard motor lower unit cooling water intake ports
350a port outboard motor
350b center outboard motor
350c starboard outboard motor
360a port outboard motor lower unit
360b center outboard motor lower unit
360c starboard outboard motor lower unit
370 marine engine flusher
372 marine engine flusher cup
374 marine engine flusher mounting frame
376 marine engine flusher swivel female threaded connection
400 bifurcating marine engine fresh water flush operating flow diagram
402 optional installing adaptor valve assembly step
404 optional opening adaptor valve step
410 obtain bifurcating marine engine fresh water flush assembly step
412 connect supply coupler to water supply step
414 connect delivery coupler to each motor step
420 set manifold valves according to motor/use arrangement step
422 turn on water supply step
430 flush motors simultaneously step
440 turn off water supply step
450 de-install bifurcating marine engine fresh water flush assembly step

What is claimed is:

1. A method of use for flushing at least two marine motors rigged upon a marine vessel, the method comprising steps of:
   obtaining a bifurcating marine motor fresh water flush assembly, the bifurcating marine motor fresh water flush assembly comprising:
      a wye comprising:
         a wye body,
         an inlet port integrally formed as part of the wye body,
         a distribution conduit integrally formed as part of the wye body,
         at least two distribution branches integrally formed as part of the wye body, and
         at least two flow control valves, each flow control valve of the at least two flow control valves are arranged within the wye body, where the flow control valve controls discharge of fluid from the respective distribution branch of the at least two distribution branches,
      a flexible supply hose having a first end coupled to the inlet port of the wye a connection coupled to a second, opposite end; and
      at least two flexible delivery hoses, each flexible delivery hose of the at least two flexible delivery hoses having a first end coupled to a distribution end of the respective distribution branch of the at least two distribution branches and a connection coupled to a second, opposite end;
   connecting the connection coupled to a second, opposite end of the flexible supply hose to a flush water source;
   placing each flow control valve of the at least two flow control valves into a closed orientation;
   connecting a selected flexible delivery hose of the at least two flexible delivery hoses of the flush water delivery system to a respective selected flush inlet connection of a respective marine motor of the at least two marine motors,
   repeating the step of connecting another selected flexible delivery hose of the at least two flexible delivery hoses of the flush water delivery system to another respective selected flush inlet connection of another respective marine motor of the at least two marine motors until each marine motor of the at least two marine motors has a flexible delivery hose of the at least two flexible delivery hoses of the flush water delivery system connected thereto, with any excess flexible delivery hoses remaining disconnected;

placing at least one flow control valve controlling fluid flow with the respective flexible delivery hose connected to the respective marine motor into an open orientation;

initiating flow of flush water from the flush water source;

activating a flush process associated with each marine motor; and continuing the flush process until the flush process is completed.

2. A method of use for flushing at least two marine motors rigged upon a marine vessel as recited in claim 1, the method further comprising a step of:

placing at least a second flow control valve controlling fluid flow with the second respective flexible delivery hose connected to the second respective second marine motor into an open orientation.

3. A method of use for flushing at least two marine motors rigged upon a marine vessel as recited in claim 1, the method further comprising a step of:

placing all flow control valves controlling fluid flow with each respective flexible delivery hose connected to each respective second marine motor into an open orientation, while retaining flow control valves controlling fluid flow with each excess flexible delivery hose remaining disconnected in a closed orientation.

4. A method of use for flushing at least two marine motors rigged upon a marine vessel as recited in claim 1, each flexible delivery hose of the at least two flexible delivery hoses further comprising an element having a swivel function located proximate the second, opposite end, the method further comprising a step of:

utilizing the swivel function of each respective to maintain a rotational orientation of the respective flexible delivery hose of the at least two flexible delivery hoses during rotational assembly of the connection coupled to a second, opposite end of the respective flexible delivery hose of the at least two flexible delivery hoses.

5. A method of use for flushing at least two marine motors rigged upon a marine vessel as recited in claim 1, each flexible delivery hose of the at least two flexible delivery hoses further comprising a female swivel connector assembled to the second, opposite end, the method further comprising a step of:

installing a male to male threaded adapter between the female swivel connector assembled to the second, opposite end of the flexible delivery hose of the at least two flexible delivery hoses and the respective selected flush inlet connection of the respective marine motor of the at least two marine motors.

6. A method of use for flushing at least two marine motors rigged upon a marine vessel as recited in claim 1, further comprising steps of:

installing an engine flush intake adaptor assembly into each flush inlet connection of the respective marine motor of the at least two marine motors, the engine flush intake adaptor assembly comprising a first connector designed to mateably engage with the flush inlet connection of the respective marine motor, a second connector located on an opposite end of the engine flush intake adaptor assembly, and an engine flush intake adaptor valve controlling flow between the first connector and the second connector of the engine flush intake adaptor assembly;

connecting the respective flexible delivery hose of the at least two flexible delivery hoses of the flush water delivery system to the respective selected flush inlet connection of the respective marine motor of the at least two marine motors; and positioning the engine flush intake adaptor valve in an open configuration providing flow between the first connector and the second connector of the engine flush intake adaptor assembly.

7. A method of use for flushing at least two marine motors rigged upon a marine vessel as recited in claim 1, each flexible delivery hose of the at least two flexible delivery hoses further comprising a quick disconnect connector located proximate the second, opposite end, wherein the step of connecting a selected flexible delivery hose of the at least two flexible delivery hoses of the flush water delivery system to the respective selected flush inlet connection of the respective marine motor of the at least two marine motors is accomplished by coupling the quick disconnect connector located proximate the second, opposite end of the selected flexible delivery hose of the at least two flexible delivery hoses to a mating quick disconnect connector installed in the respective selected flush inlet connection of the respective marine motor of the at least two marine motors; and wherein the step of repeating the step of connecting another selected flexible delivery hose of the at least two flexible delivery hoses of the flush water delivery system to another respective selected flush inlet connection of another respective marine motor of the at least two marine motors is accomplished by coupling the quick disconnect connector located proximate the second, opposite end of the another selected flexible delivery hose of the at least two flexible delivery hoses to another mating quick disconnect connector installed in the respective selected flush inlet connection of the respective marine motor of the at least two marine motors until each marine motor of the at least two marine motors.

8. A method of use for flushing at least two marine motors rigged upon a marine vessel as recited in claim 1, wherein the assembly of the at least two flexible delivery hoses, each flexible delivery hose of the at least two flexible delivery hoses having a first end coupled to a distribution end of the respective distribution branch of the at least two distribution branches and a connection coupled to a second, opposite end is completed by steps of:

an end user fulfills the at least two flexible delivery hoses by selecting a set of at least two flexible delivery hoses wherein each a flexible delivery hose of the selected set of set of at least two flexible delivery hoses, has a length suitable for installation of the bifurcating marine motor fresh water flush assembly onto an arrangement of the at least two marine motors rigged upon the marine vessel;

assembling a first end of each of the selected set of at least two flexible delivery hoses to the distribution end of the respective distribution branch of the at least two distribution branches of the wye.

9. A method of use for flushing at least two marine motors rigged upon a marine vessel as recited in claim 1, further comprising steps of:

selecting an appropriate connector for use between the connection coupled to a second, opposite end of each flexible delivery hose of the at least two flexible delivery hoses, wherein the appropriate connector is selected from a group of appropriate connectors comprising:

a) a male thread connection,
b) a female swivel connector,
c) a male to male threaded adapter,
d) a quick disconnect connector, and
e) a engine flush intake adaptor assembly;
assembling the appropriate connector between the second, opposite end of each respective at flexible delivery hose of the at least two flexible delivery hoses and the respective selected flush inlet connection of a respective marine motor of the at least two marine motors.

10. A method of use for flushing at least two marine motors rigged upon a marine vessel as recited in claim 1, the wye body further comprising a manifold distribution branch identifier, the manifold distribution branch identifier being a unique identifier associated with each respective distribution branch of the at least two distribution branches, the method further comprising steps of:

associating each respective marine motor of the at least two marine motors with the respective manifold distribution branch and associated flow control valve of the at least two flow control valves by using the respective manifold distribution branch identifier.

11. A method of use for flushing at least two marine motors rigged upon a marine vessel as recited in claim 1, wherein the flush water source is a spigot.

* * * * *